(12) United States Patent
Abdi et al.

(10) Patent No.: US 8,557,726 B2
(45) Date of Patent: Oct. 15, 2013

(54) CHIRAL HETEROGENEOUS CATALYST FOR ASSYMMETRIC NITROALDOL REACTION

(75) Inventors: Sayed H. R. Abdi, Bhavnagar (IN); Rukhsana I. Kureshy, Bhavnagar (IN); Noor-Ui H. Khan, Bhavnagar (IN); Hari C. Bajaj, Bhavnagar (IN); Vishal J. Mayani, Bhavnagar (IN); Arpan K. Shah, Bhavnagar (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 13/634,187

(22) PCT Filed: Oct. 11, 2010

(86) PCT No.: PCT/IB2010/002576
§ 371 (c)(1),
(2), (4) Date: Nov. 26, 2012

(87) PCT Pub. No.: WO2011/110895
PCT Pub. Date: Sep. 15, 2011

(65) Prior Publication Data
US 2013/0096333 A1 Apr. 18, 2013

(30) Foreign Application Priority Data

Mar. 12, 2010 (IN) .............................. 573/DEL/2010

(51) Int. Cl.
*B01J 31/00* (2006.01)
*C07F 7/10* (2006.01)
*C07C 205/00* (2006.01)

(52) U.S. Cl.
USPC ................ 502/165; 502/158; 556/9; 568/704

(58) Field of Classification Search
USPC ........................ 556/9; 568/704; 502/158, 165
See application file for complete search history.

(56) References Cited

U.S. PATENT DOCUMENTS

| | | | | |
|---|---|---|---|---|
| 3,560,575 A | * | 2/1971 | Tindall | 568/712 |
| 3,564,062 A | * | 2/1971 | Tindall | 568/712 |
| 4,496,772 A | * | 1/1985 | Lai | 568/704 |
| 4,933,505 A | * | 6/1990 | Barrett et al. | 568/705 |
| 6,977,315 B2 | * | 12/2005 | Yamada et al. | 568/705 |
| 8,354,560 B2 | * | 1/2013 | Major et al. | 568/704 |

\* cited by examiner

*Primary Examiner* — Porfirio Nazario Gonzalez
(74) *Attorney, Agent, or Firm* — Wilmer Cutler Pickering Hale and Dorr LLP

(57) ABSTRACT

The present invention relates to the preparation of highly efficient chiral heterogeneous catalyst for asymmetric nitroaldol reaction, wherein Henry reactions of various aldehydes such as aromatic, aliphatic, α,β-unsaturated aldehydes, alicyclic aldehydes and nitroalkenes were carried out to produce optically active β-nitroalcohols in high yield, with moderate to excellent enantioselectivity (ee up to >99%) in presence of a base and an optically active chiral heterogeneous catalyst.

21 Claims, 13 Drawing Sheets

(i)              (ii)                    (iii)

CHIRAL HETEROGENEOUS CATALYST FOR ASSYMMETRIC NITROALDOL REACTION

CROSS-REFERENCE TO RELATED APPLICATIONS

This application is a national stage application of prior International Application No. PCT/IB2010/002576, entitled "Chiral Heterogeneous Catalyst for Asymmetric Nitroaldol Reaction", filed on Oct. 11, 2010, which claims the benefit of and priority to Indian Patent Application Ser. No. 573/DEL/2010 filed Mar. 12, 2010, the disclosure of each of which is hereby incorporated by reference in its entirety for all purposes.

FIELD OF THE INVENTION

The present invention provides chiral heterogeneous catalyst for asymmetric nitroaldol reaction. More particularly, the present invention relates to the preparation of highly efficient chiral heterogeneous catalyst of copper complexes of optically pure amino alcohols covalently attached on to mesoporous silica surface for asymmetric nitroaldol reaction. The present invention demonstrates the direct heterogeneous catalysis, where silica modified with chiral amino alcohols has been prepared and evaluated as a potential new class of solid chiral ligand for copper catalyzed nitroaldol (Henry) reaction, which produces optically pure nitro alcohols. Optically pure nitro alcohols are important intermediates in the preparation of chiral pharmaceuticals and amino alcohols.

BACK GROUND OF THE INVENTION

Most of the biological receptor molecules are stereo-specific, hence different enantiomers of a racemic drug compound may interact with them in a different manner. Therefore, two enantiomers of a racemic compound may have different pharmacological activities. In order to distinguish these contradictory effects, the biological activity of each enantiomer needs to be studied separately. This has contributed significantly towards the requirement of enantiomerically pure compounds particularly in pharmaceutical industry. Chiral nitro alcohols are important class of compounds for the synthesis of amino alcohols, which are required in many areas of research such as biologically active natural products, pharmaceuticals, chiral auxiliaries, agrochemicals and chiral ligands. To achieve chirally pure nitro-alcohols, asymmetric Henry reaction is one of the most important routes. Various attempts have been made in the past for synthesis of optically pure nitro alcohols; for example M. J. Sorgedrager et al., in Tetrahedron: Asymmetry, 15 (2004) 1295 reported the kinetic resolution of a range of 1-nitro-2-alkanols by lipase catalyzed esterification using various lipases and succinic anhydride as an acyl donor. E values of up to 100 were obtained with Novozym 435 in the resolution of 1-nitro-2-pentanol with succinic anhydride in TBME. Acylation with succinic anhydride proved much more enantioselective than with vinyl acetate. The drawbacks of this process are; (i) highest theoretical yield is only 50%; (ii) highly substrate specific and do not work for aromatic aldehydes; (iii) substrate and product degradation to the corresponding alkene under the condition used.

J. Tian et al., in Angew. Chem. Int. Ed., 41 (19) (2002) 3636 disclosed the work based asymmetric sequential reaction with a multifunctional ($YLi_3$-{tris(binaphthoxide)}) single catalyst component, in which tuning of the chiral catalyst by achiral additives had a key role in constructing a proper chiral environment. These catalysts provide nitroaldol products of simple aromatic aldehyde in 51-84% with ee 11-62% at extremely low temperatures. The drawbacks of this process are; (i) catalysis requires very lower temperature ($-40°$ C.) for completion of reaction; (ii) Yields and ee of the product are moderate; (iii) separation of the catalyst from the product is difficult hence catalyst is non-recyclable.

D. A. Evans et al., in J. Am. Chem. Soc., 125 (2003) 12692 describes the synthesis of a series of divalent metal acetates in combination with chiral bidentate ligands used as enantioselective catalysts for the nitroaldol process. In this process bis(oxazoline) complexes derived from $Cu(OAc)_2$ was found to be the best catalyst for the nitroaldol reaction of various aldehydes to give products in 66-95% and ee in 89-94%. The drawback of this process is (i) Catalyst is non-recyclable.

S. Handa et al., in Angew. Chem. Int. Ed., 47 (2008) 3230 described the use of dinucleating Schiff base in catalytic asymmetric nitroaldol (Henry) reaction providing β-amino alcohols by reduction of the nitro moiety in nitroaldol adducts to give products in 25-92% and ee in 1-84%. The drawbacks of this process are; (i) reaction takes long time (48 h) to complete; (ii) catalytic reaction needs very lower temperature about ($-40°$ C.); (iii) expensive metal source like palladium and lanthanum were used; (iv) catalyst is non-recyclable.

K. Iseki et al., in Tetrahedron Letters, 37(50) (1996) 9081 used $α,α'$-difluoro aldehydes mediated by rare earth-lithium-BINOL complexes for asymmetric nitroaldol reaction. Catalytic reaction gave products in 55-82% and ee in 55-94%. The drawbacks of this process are; (i) completion of reaction takes very long time (96 h); (ii) catalytic reaction needs very lower temperature ($-40°$ C.); (iii) expensive metal sources like lanthanum; samarium europium, ytterbium and gadolinium were used; (iv) catalyst is non-recyclable.

A. P. Bhatt et al., in J. Mol. Cat. A, 244 (2006) 110 reported recyclable catalyst based on La—Li-BINOL-silica and La—Li-BINOL-MCM-41 covalently anchored on silica and mesoporous MCM-41, respectively, for enantio selective nitroaldol reaction. Asymmetric nitroaldol with this complex gave product in 0-94% yield and ee in 55-90%. The drawbacks of this process are; (i) multi-step catalyst synthesis protocol (ii) catalytic reaction needs very lower temperature ($-40°$ C.); (iii) very expensive metal complexes such as La-BINOL is used as catalyst.

Y. Sohtome et al., in Adv. Synth. Catal., 347 (2005) 1643 disclosed guanidine-thiourea bi-functional organo-catalyst for the asymmetric Henry (Nitroaldol) reaction. Organo-catalyzed reaction gave product in 22-91% and ee in 6-43%. The drawbacks of this process are; (i) asymmetric nitroaldol catalyst is selective only for aliphatic and alicylclic aldehydes; (ii) synthesis and separation of guanidine thiourea bi-functional derivatives are difficult; (iii) conversion and enantioselectivity is very low; (iv) hazardous 50 mol % KOH is used as promoter.

Y. Sohtome et al., in Chem. Asian J., 2 (2007) 1150 described the organo-catalytic asymmetric nitroaldol reaction and co-operative effects of guanidine and thiourea functional groups on asymmetric catalysis. Organo-catalyzed reaction gave products in 80-99% and ee in 32-95%. The drawbacks of this process are (i) do not demonstrate nitroaldol reaction for aromatic aldehydes; (ii) low temperature is used; (iii) hazardous 50 mol % KOH is used as base.

R. Kowalczyk et al., in Tetrahedron: Asymmetry, 18 (2007) 2581 described asymmetric nitroaldol reaction catalyzed by a Cr(III)-salen system. Chiral Cr(III)-salen-type complexes derived from 1,2-diaminocyclohexane and 1,2-diphenylethylenediamine were found to catalyze the enantioselective Henry reaction. Salen complex catalyzed nitroaldol reaction gave products in good yield but in moderate ee at −20° C. The drawbacks of this process are; (i) catalyst is non-recyclable; (ii) reaction temperature is very low; (iii) enantioselectivity is moderate. W. Mansawat et al., in Tetrahedron Letters, 48 (2007) 4235 described the novel thiolated amino-alcohols as chiral ligands for Cu-catalyzed asymmetric nitroaldol reactions. Thiolated amino-alcohols have been synthesized and evaluated as a potential new class of chiral ligands for copper catalyzed nitroaldol reactions to give product in 69-92% and ee in 0-46%. The drawbacks of this process are; (i) good conversion and enantioselectivity was achieved for benzaldehydes with electron-withdrawing groups only; (ii) catalyst is non-recyclable.

G. Blay et al., in Tetrahedron: Asymmetry, 17 (2006) 2046 describe modular iminopyridine ligands and application to the enantioselective Cu(II) catalyzed Henry reaction. The drawbacks of this process are; (i) recycling of expensive Schiff base ligands and iminopyridine ligands are not possible; (ii) ee up 86% with good yield was achieved only at extremely low temperatures (iii) only o-anisol was tested for nitroaldol reaction.

B. M. Choudary et al., in J. Am. Chem. Soc., 127 (2005) 13167 described the design and development of a truly recyclable heterogeneous catalyst, nano crystalline MgO, for the asymmetric Henry reaction to afford chiral nitro alcohols. The drawback of this process is; (i) extremely low temperature (−78° C.) is required to show high activity and enantioselectivity.

Y. Zhang et al., Inorg. Chim. Acta, 361 (2008) 1246 disclosed synthesis, structure, and catalytic activity of chiral Cu(II) and Ag(I) complexes with (S,S)-1,2-diamino cyclohexane-based $N_4$-donor ligands for asymmetric nitroaldol reaction. The drawbacks of this process are; (i) only benzaldehyde is used as substrate; (ii) catalysts are non-recyclable; (iii) moderate conversions with low enantioselectivity were achieved at low temperatures.

B. M. Trost et al. in U.S. Pat. No. 6,610,889 Jul. 19, 2005 disclosed catalytic compositions and methods for asymmetric aldol reactions. Methods and compositions are provided for the direct catalytic asymmetric aldol reaction of aldehydes with donor molecules selected from ketones and nitro alkyl compounds. The drawbacks of this process are; (i) 1N HCl is required to remove the expensive ligand from the catalytic reaction mixture; (ii) ligand is non-recyclable (iii) for best results very low temperature (−20 to −60° C.); (iii) extremely dry reaction condition is required. M. Mitsuda et al. in U.S. Pat. No. 5,616,726 May 30, 2000 disclosed a process of preparation of optically active aminoalcohol derivatives. The drawbacks of this process are; (i) 1N HCl is required to remove the ligand from reaction mixture; (ii) expensive complex of lanthanum/(S)-1,1'-bi-2-naphthol was not recycled; (iii) requires low temperature (−30° C.) for best results; (iv) reaction requires long time for completion (72 h).

L. Deng et al. in U.S. Pat. No. 130,453 Dec. 7, 2006 described process of asymmetric aldol addition using bifunctional cinchona-alkaloid-based catalysts. Present invention relates to asymmetric nitroaldol reaction with α-keto esters catalyzed by a new C6'-OH cinchona alkaloid catalyst. Disadvantage of this process are; (i) reaction conditions requires very low temperature (−20° C.); (ii) reaction time is too long (67 h); (iii) requires inert or toxic gas like HCN medium in some cases; (iv) catalyst recycling was not demonstrated.

M. Shibasaki et al. in U.S. Pat. No. 6,632,955 Apr. 17, 2007 reported the synthesis of optically active nitro alcohol derivatives using Ln—Li-BINOL complex as catalyst. The drawbacks of this process are; (i) reaction time is too long (67 h); (ii) reaction conditions requires very low temperature (−40° C.); (iii) 1N aqueous solution of hydrochloric acid (HCl) was used to separate the products from the reaction mixture; (iv) the catalyst is not recyclable.

T. Yamada et al. in U.S. Pat. No. 6,977,315 Dec. 20, 2005 described a process for producing optically active nitro alcohols using N,N-bis[2-(2,4,6-trimethylbenzoyl)-3-oxobutylidene]-(1S,2S)-bis(3,5-dimethylphenyl)ethylene-1,2-diaminato cobalt (II) complexes as catalysts in the presence of a base. The drawbacks of this process are; (i) reaction time is too long (76 h); (ii) reaction conditions requires very low temperature (−70° C.); (iii) the catalyst is not recyclable.

M. Shibasaki et al. in U.S. Pat. No. 5,336,653 Aug. 9, 1994 described the catalyst for asymmetric synthesis separation. The catalyst of the present invention is extremely valuable as a catalyst for asymmetric synthesis of an asymmetric nitroaldol reaction useful in the synthesis of a β-hydroxy nitro compound, which is an important synthetic raw material for an optically active compound such as a medicine. The drawbacks of this process are; (i) catalyst preparation requires long time (3 days) (ii) works better only with cyclohexyl aldehyde as substrate, while both conversion and ee is moderate with other substrates; (ii) reaction temperature is −42° C., which is very low.

K. Ma and J. You Chem. Eur. J. 13 (2007) 1863 disclosed the rational design of sterically and electronically easily tunable chiral bisimidazolines and their applications in dual Lewis acid/Brønsted base catalysis for highly enantioselective nitroaldol (Henry) reactions. The drawback of this process is; (i) ligand preparation requires expensive starting materials and the resulting metal complexes used as catalysts are not recyclable.

V. J. Mayani et al., in J. Chromatogr A. 1135 (2006) 186 described the synthesis of silica supported aminoalcohols and used them as chiral stationary phase for chromatographic separation of racemic compounds such as mandelic acid, BINOL, diethyl tartrate, cyanochromene oxide and 2-phenyl propionic acid. However, there is no mention of the use of this material in catalysis.

V. J. Mayani et al., in J. Chromatogr A. 1191 (2008) 223 disclosed synthesis and characterization of chiral copper complex of amino alcohol modified silica as chiral ligand exchange stationary phase (CLES). This material gave excellent separation of mandelic acid, but it was neither used as catalyst nor incarporated any additive to enhance its performance.

OBJECTIVES OF THE INVENTION

The main objective of the present invention is to provide chiral heterogeneous catalyst of copper complexes of optically pure amino alcohols covalently attached on to mesoporous silica surface for asymmetric nitroaldol reaction.

Yet another objective of the present invention is to provide preparation of chiral heterogeneous catalysts of copper complexes of optically pure amino alcohols covalently attached on to mesoporous silica surface.

Another object of the present invention is to use this chiral catalyst for asymmetric nitroaldol reaction.

Yet another object of the present invention is to provide a process for the synthesis of copper complexes derived from optically pure amino alcohols covalently attached on to mesoporous silica asymmetric nitroaldol reaction to yield 1,2-nitroalcohols in high yield.

Still another object of the present invention is to use this copper complex attached to mesoporous silica (copper catalyst) for asymmetric nitroaldol reaction of various aldehydes, aromatic aldehydes, aliphatic aldehydes, α,β-unsaturated aldehydes and alicyclic aldehydes to obtain 1,2-nitroaldol with enantioselectivity more than 98%.

Still another object of the present invention is to recycle the chiral heterogeneous catalyst without loss in yield of final product and having enantioselectivity greater than 97%.

Still another object of the present invention is to provide a method wherein different non-chiral and chiral organic bases are used as additives to produce chirally pure 1,2-nitro alcohols in high yield and excellent ee (>99%) at ambient temperature.

Still another object of the present invention is to prepare chirally pure 1,2-nitroalcohols using copper heterogeneous catalyst having copper loading less than or equal to 10 mol %.

SUMMARY OF THE INVENTION

Figure 1:
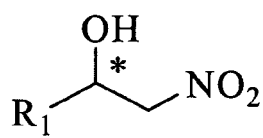
FIG. 1 represents optically pure β-nitroalcohols, where in, $R_1$=aromatic, aliphatic, unsaturated and alicyclic groups and * represents S or R chiral configuration
Figure 2:
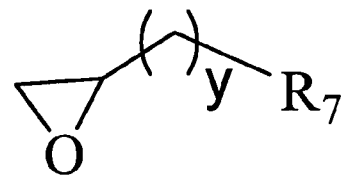
FIG. 2 represents chiral epoxide, where in $R_7$=chloro, fluoro, iodo or bromo group, y=1-8 alkyl chain and * represents S or R chiral configuration
Figure 3:
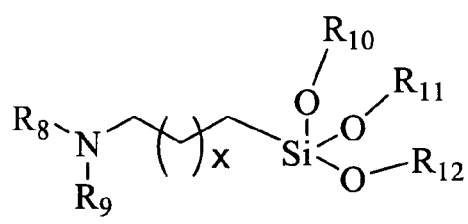
FIG. 3 represents silylating agents, where in, $R_8$, $R_9$=independently hydrogen atom or alkyl group, $R_{10}$, $R_{11}$ and $R_{12}$=alkyl group, x=1-8
Figure 4:
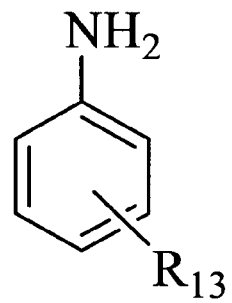
FIG. 4 represents the nucleophile (derivative of aniline), where in, $R_{13}$=independently hydrogen atom, nitro, chloro, fluoro, bromo, iodo, methoxy, ethoxy, methyl group
Figure 5:
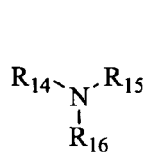
FIG. 5 represents bases as additive, where in structure (a) $R_{14}$, $R_{15}$ and $R_{16}$ are independently a hydrogen atom, or a straight, branched or cyclic alkyl group which may have substituent. Further, in structure (b) $R_{17}$, $R_{18}$, $R_{19}$, $R_{20}$ and $R_{21}$ are independently a hydrogen atom or an alkyl group. Furthermore, in structure (c) $R_{22}$, $R_{23}$, $R_{24}$, $R_{25}$, $R_{26}$, $R_{27}$, $R_{28}$, $R_{29}$, $R_{30}$, $R_{31}$ and $R_{32}$ are independently a hydrogen atom, straight, branched or cyclic alkyl group or alkoxy group or halide group and * is R or S chiral configuration
Figure 5:
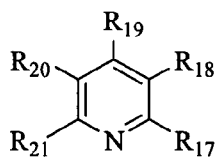
Figure 5:
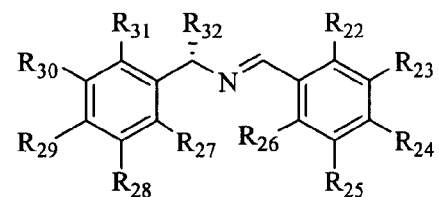

Accordingly, the present invention provides chiral heterogeneous catalyst for asymmetric nitroaldol reaction. The present invention also relates to the preparation of highly efficient chiral heterogeneous catalyst of copper complexes of optically pure amino alcohols covalently attached on to mesoporous silica surface for asymmetric nitroaldol reaction of various aromatic, aliphatic, α,β-unsaturated aldehydes and alicyclic aldehydes providing different 1,2-nitro alcohols in high yield and excellent enantioselectivity (>99%) at room temperature.

In an embodiment of the present invention a chiral heterogeneous catalyst of general formula 1, Formula 1

Wherein, $R_1=R_2=$H or $CH_3$ $R_3=$Cl, I, F, Br, $OCH_3$, $CH_3$, $OC_2H_5$, $NO_2$ $R_4=$H, $CH_3$, $C_2H_5$ x=1, 2

$Z=CH_3CO_2^-$, $Cl^-$, $OH^-$, $NO_3^-$,

In another embodiment of the present invention, wherein mesoporous silica is selected from the group consisting of silica gel, Mobile Crystalline Materials (MCM-41), Santa Barbara Amorphous (SBA-15) and Meso Cellular Foams (MCF) having porosity in the range of 30 to 120 Å.

In yet another embodiment of the present invention, wherein catalysts of formula 1 are (S)-aminopropyl alcohol-copper-support-41, (R)-aminopropyl alcohol-copper-support-41, (S)-aminopropyl alcohol-copper-support-15, (R)-aminopropyl alcohol-copper-support-15, (S)-aminopropyl alcohol-copper-support-MCF, (R)-aminopropyl alcohol-copper-support-Mesocellular Foams (MCF), (S)-aminopropyl alcohol-copper-support-Mesocellular Foams (MCF), (R)-aminopropyl alcohol-copper-support-Mesocellular Foams (MCF), (S)—N-methyl aminopropyl alcohol-copper-support-41, (R)—N-methyl aminopropyl alcohol-copper-support-41, (S)—N,N'-dimethyl aminopropyl alcohol-copper-support-41, (S)—N,N'-dimethyl aminopropyl alcohol-copper-support-15, (S)—N-methyl aminopropyl alcohol-copper-support-15, (S)-aminopropyl alcohol-copper-support-silicagel and (R)-aminopropyl alcohol-copper-support-silicagel.

In yet another embodiment of the present invention, a process for the preparation of chiral heterogeneous catalyst of formula 1, wherein the said process comprises of steps:
(i) silylating a chiral [(S)/(R)-(+)/(−)-] epoxide ranging between 1.0-15 mmol/g of mesoporous silica with substituted aminopropyl trialkoxysilane ranging between 1.0-15 mmol/g of mesoporous silica in an equimolar ratio in the presence of alkali carbonate in a molar ratio ranging between 1.0 to 5 based on chiral epoxide in dry tetrahydrofuran (THF);
(ii) refluxing the reaction mixture as obtained in step (i) under inert atmosphere for a period in the range of 8 to 16 h at temperature ranging between 65 to 66° C.;
(iii) filtering the reaction mixture as obtained in step (ii) to obtain clear solution;
(iv) refluxing the clear solution as obtained in step (iii) with mesoporous silica in the range (3.5:10) in dry toluene under inert atmosphere for a period in the range of 35 to 55 h at temperature ranging between 110 to 115° C.;
(v) filtering the reaction mixture as obtained in step (iv) to obtain solid material, followed by washing with toluene and Soxhlet extraction in toluene;
(vi) reacting the washed solid material as obtained in step (v) with substituted anilines in the concentration ranging between 2 to 30 mmol/g of the solid material under reflux condition in inert atmosphere for a period ranging between 8-16 h in toluene at temperature ranging between 110 to 115° C.;
(vii) reacting the washed solid material as obtained in step (vi) with copper salt in ethanol in the concentration range of 1.0 to 20.0 mmol/g of material obtained in step (vi) in inert atmosphere for a period in the range of 8-16 h at room temperature in the range of 25 to 35° C.;
(viii) filtering the reaction mixture of step (vii) to obtain solid material, followed by washing with toluene and again Soxhlet extraction in toluene to obtain chiral heterogeneous catalyst.

In yet another embodiment of the present invention, wherein chiral epoxide used in step (i) is selected from the group consisting of 1-chloro-2,3-epoxypropane, 1-fluoro-2,3-epoxypropane, 1-bromo-2,3-epoxypropane, 1-chloro-2,3-epoxy butane and 1-chloro-2,3-epoxy pentane.

In yet another embodiment of the present invention, wherein substituted aminopropyl trialkoxysilane used in step (i) is selected from the group consisting of aminopropyl triethoxysilane, aminopropyl trimethoxysilane, aminopropyl tributoxysilane, N-methyl aminopropyl trimethoxysilane, N-methyl aminopropyl triethoxysilane, N-methyl aminopropyl tributoxysilane, aminobutyl trimethoxysilane and aminopentyl triethoxysilane.

In yet another embodiment of the present invention, wherein alkali carbonate used in step (i) is selected from the group consisting of sodium carbonate, potassium carbonate, rubidium carbonate and cesium carbonate.

In yet another embodiment of the present invention, wherein the molar ratio of substituted aniline and chiral epoxide is in the range of 1:1 to 1:2.

In yet another embodiment of the present invention, wherein substituted aniline used in step (vi) are selected from the group consisting of aniline, nitroaniline, fluoroaniline, chloroaniline, bromoaniline, iodoaniline, methoxyaniline, ethoxyaniline and methylaniline.

In yet another embodiment of the present invention, wherein copper salt used in step (vii) is selected from the group consisting of copper chloride, copper acetate, copper sulphate and copper triflate.

In yet another embodiment of the present invention, wherein copper loading on chiral heterogeneous catalyst is in the range of 10 to 25 mol %.

In yet another embodiment of the present invention, a process for preparation of nitroalcohol by asymmetric nitroaldol reactions using chiral heterogeneous catalyst of general formula 1 as claimed in claim 1, wherein said process comprising the steps of;
a) stirring chiral heterogeneous catalyst in a solvent and a base as an additive in a screw cap vials under inert and dry condition for a period ranging between 1 to 5 min at a temperature ranging between 25 to 28° C.
b) adding nitromethane and an aldehyde into the solution as obtained in step (a) followed by continuous stirring for a period ranging between 36 to 48 hrs at temperature ranging between −20 to 110° C., preferably in the range of 10-60° C.;
c) filtering the reaction mixture as obtained in step (b) followed by washing with dry ethanol and drying over magnesium sulphate;
d) evaporating the solvent from the solution as obtained in step Ⓒ under vacuum to obtain nitroalcohol;
e) purifying the residue as obtained in step (d) by column chromatography using mixture of n-hexane and ethyl acetate (90:10) to obtain pure nitroalcohol.

In yet another embodiment of the present invention, wherein heterogeneous asymmetric catalyst used in step (a) ranges between 1 to 50 mol %, preferably in the range of 5 to 35 mol % based on aldehyde.

In yet another embodiment of the present invention, wherein base used in step (a) ranges between 1.0 to 100 mol %, preferably in the range of 10 to 40 mol % based on aldehyde.

In yet another embodiment of the present invention, wherein nitromethane used in step (b) ranges between 0.4 to 5.5 m·mol.

In yet another embodiment of the present invention, wherein base used in step (a) is selected from the group consisting of primary amine, secondary amine, tertiary amine, pyridine, 2-methylpyridine, 2,6-lutidine, trimethylamine, triethylamine, (S)—N-benzylidene-1-phenylethanamine, (S)—N-(4-methylbenzylidene)-1-phenylethanamine, (S)—N-(4-chlorobenzylidene)-1-phenylethanamine, (S)—N-(4-nitrobenzylidene)-1-phenylethanamine, (S)—N-(2-methoxybenzylidene)-1-phenylethanamine, (R)—N-benzylidene-1 phenylethanamine, (R)—N-(4-methylbenzylidene)-1-phenylethanamine, (R)—N-(4-chlorobenzylidene)-1-phenylethanamine, (R)—N-(4-nitrobenzylidene)-1-phenylethanamine and (R)—N-(2-methoxybenzylidene)-1-phenylethanamine.

In yet another embodiment of the present invention, wherein aldehyde used in step (b) is selected from the group consisting of aromatic aldehyde, aliphatic aldehyde, $\alpha,\beta$-unsaturated aldehydes and alicyclic aldehydes.

In yet another embodiment of the present invention, wherein solvent used in step (a) is selected from the group consisting of toluene, tetrahydrofuran, diethyl ether and ethanol.

In yet another embodiment of the present invention, wherein enantiomeric excess of nitro alcohols obtained is in the range of 5 to 99%.

In yet another embodiment of the present invention, wherein yield of nitro alcohols obtained is in the range of 61-98%.

In yet another embodiment of the present invention, wherein catalyst used in step (a) is recyclable.

DESCRIPTION OF THE INVENTION

In a typical process for the synthesis of the novel asymmetric heterogeneous catalyst (S)/(R)-(+)-epihalohydrin, 3-aminopropyl triethoxysilane, potassium carbonate were allowed to stir and reflux in dry tetrahydrofuran under inert atmosphere for 8-16 h. After that, reaction mixture was filtered under an inert atmosphere and the solvent was removed from the filtrate. The resulting mass was dissolved in dry toluene to which appropriate mesoporous silica was added and the resulting suspension was refluxed for 35-55 h followed by its filtration. The solid thus collected was washed using dry toluene and dried under vacuum. The dried material was subjected to Soxhlet extraction with dry toluene and the epoxy product thus obtained was reacted with anilines in dry refluxing toluene under an inert atmosphere. The reaction mixture was cooled to room temperature, the solid was filtered, washed with dry toluene and subjected to Soxhlet extraction with toluene and iso-propanol and finally the solid was dried under normal vacuum at 40° C. to give (S)/(R)-amino alcohol-support-mesoporous silica which was then reacted with an appropriate copper (II) salt to give the chiral heterogeneous catalyst.

Enantiomeric excess (ee) and optical purity of products were determined by the use of programmable high-performance liquid chromatography system (HPLC, CLASS-VP 10A, 20 □L injection loop, PDA detector, Shimadzu), Gas chromatography (GC 14B, Shimadzu) and Automatic polarimeter (Digipol-781, Rudolph Instrument, USA). Perkin-Elmer Series II, 2400 CHN analyzer was used for the microanalysis of the samples. $^1$H, $^{13}$C & solid-state $^{13}$C CP-MAS NMR Spectra were recorded on 200 and 50-MHz Spectrometer (Bruker F113V), FTIR spectra were obtained using KBr (Perkin-Elmer spectrum GX spectrophotometer), Powder X-ray diffraction (PXRD) analysis of the samples were accomplished by a Phillips X"pert MPD diffractometer in 2 theta range (1.5-10) at scan speed of $0.4°\sec^{-1}$. Thermo gravimetric measurements and microstructure assessment of these samples was done on a Mettler Toledo TGA instrument, scanning electron microscope on a SEM, LEO 1430VP microscope and transmission electron microscope on a TEM, Techai 20, (Phillips Netherland). BET surface area, total pore volume and BJH pore diameter were found from (Micromeritics ASAP-2010, USA). The Cu estimation of complex was determined on an inductive coupled plasma (ICP) spectrometer (Perkin-Elmer, USA; model ICP optima 3300 RL).

Triblock copolymer poly(ethylene oxide)-poly(propylene oxide)-poly(ethylene oxide) pluronic P123, Racemic epichlorohydrin, Tetraethayl orthosilicate (TEOS), aniline, 2,4-di-t-butyl phenol, copper acetate monohydrate (Aldrich, USA), 3-aminopropyl triethoxysilane, racemic mandelic acid, 1R,2R-(-)-1,2-diaminocyclohexane, (Fluka, USA), cobalt acetate (s. d. fine chem. ltd, India), para formaldehyde, racemic 2,6-dimethylpyridine (National Chemicals, India), stannous chloride (Merck Germany) HCl (Ranbaxy, India), were used as received. Anhydrous $K_2CO_3$ (Rankem, India) was pre-activated at 80° C. for 3 h before synthetic use. All the solvents used in the present study were dried by known purification technique. All chemical reactions were carried out under anhydrous conditions using nitrogen atmosphere and oven-dried glassware unless otherwise stated.

Figure 6:
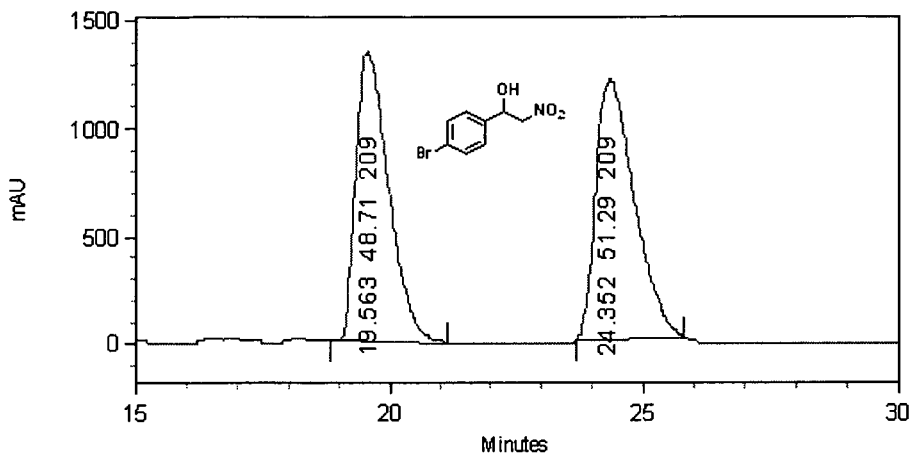
FIG. 6 represents the HPLC chromatogram racemic 1-(4-Bromophenyl)-2-nitroethanol
Figure 7:
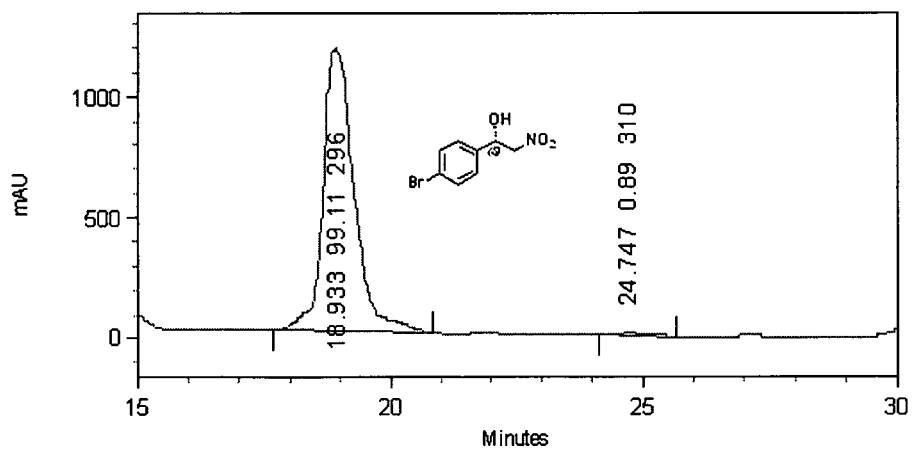
FIG. 7 represents the HPLC chromatogram of (S)-1-(4-Bromophenyl)-2-nitroethanol
Figure 8:
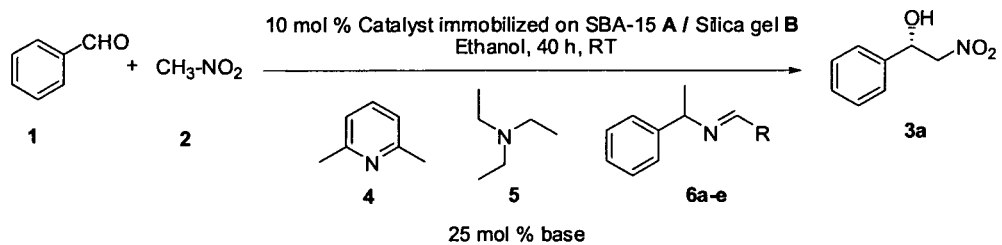
FIG. 8 represents catalytic study of mixture of different materials on asymmetric nitroaldol reaction with benzaldehyde 1 and nitromethane 2 to give product 3 in the presence of a base a/b/c selected from FIG. 6
Figure 9:
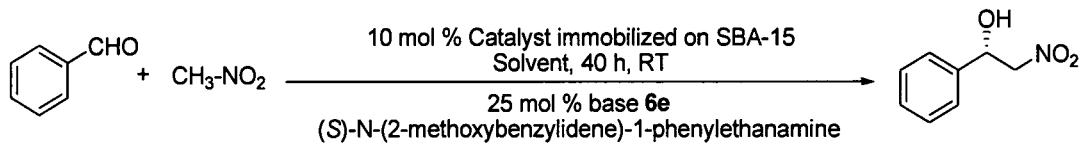
FIG. 9 represents effect of solvent selected from toluene, tetrahydrofuran, diethylether, dichloromethane, ethanol and methanol on asymmetric nitroaldol reaction of benzaldehyde
Figure 10:
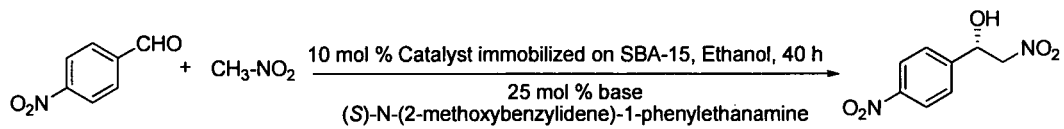
FIG. 10 represents the temperature effect on asymmetric nitroaldol reaction of 4-nitrobenzaldehyde FIG. 11 TGA curve of calcined MCM-41(P), (S)-amino epoxy-support-41 (Q) and (S)-amino alcohol-support-41 (R)
Figure 11:
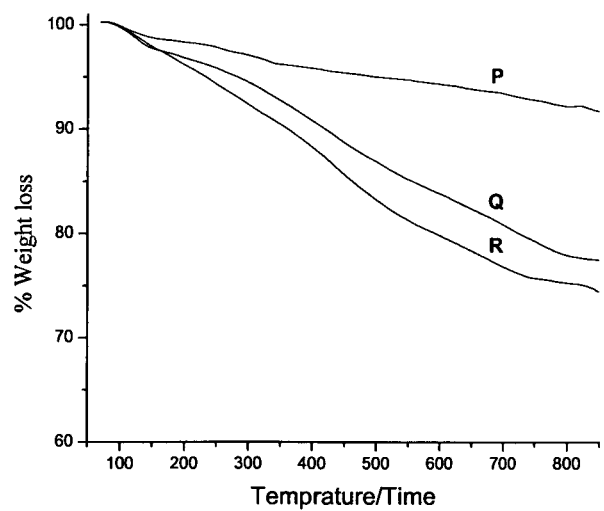
Figure 12:
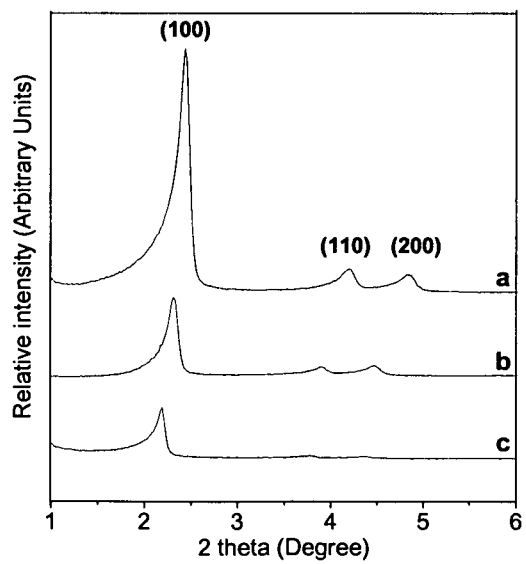
FIG. 12 Powder X-ray diffraction pattern of calcined MCM-41(a), (S)-amino epoxy-support-41 (b) and (S)-amino alcohol-support-41 (c)
Figure 13:
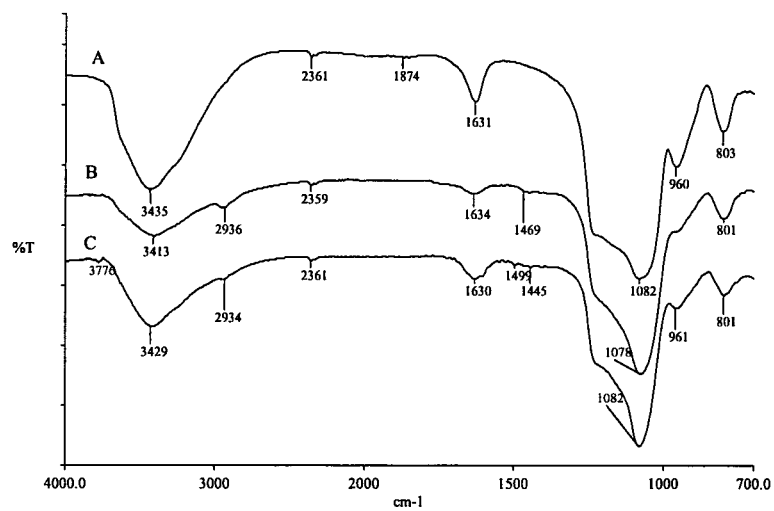
FIG. 13 FTIR spectra of calcined MCM-41(A), (S)-amino epoxy-support-41 (B) and (S)-amino alcohol-support-41 (C)
Figure 14:
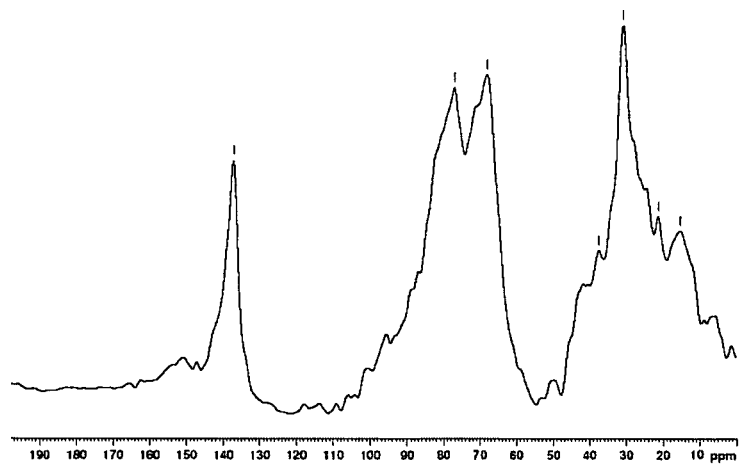
FIG. 14 Solid-state $^{13}$C CP-MAS NMR spectra of (S)-amino alcohol-support-41 silica 1
Figure 15:
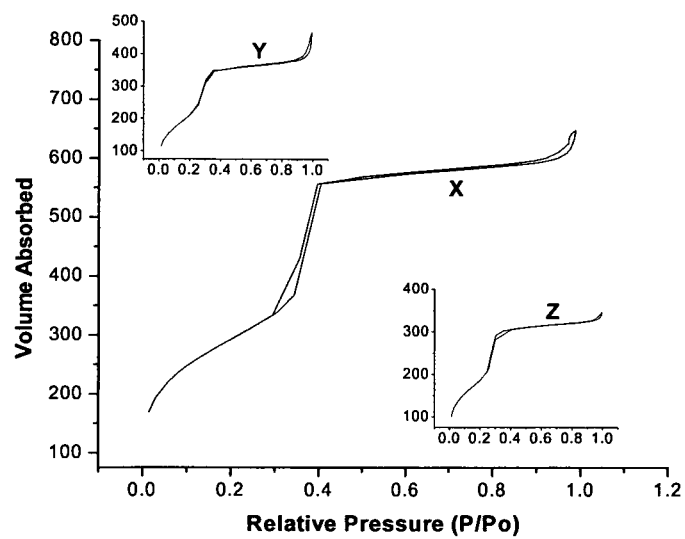
FIG. 15 Nitrogen adsorption/desorption isotherms of MCM-41(X), (S)-amino epoxy-support-41 (Y) and (S)-amino alcohol-support-41 (Z)
Figure 16:
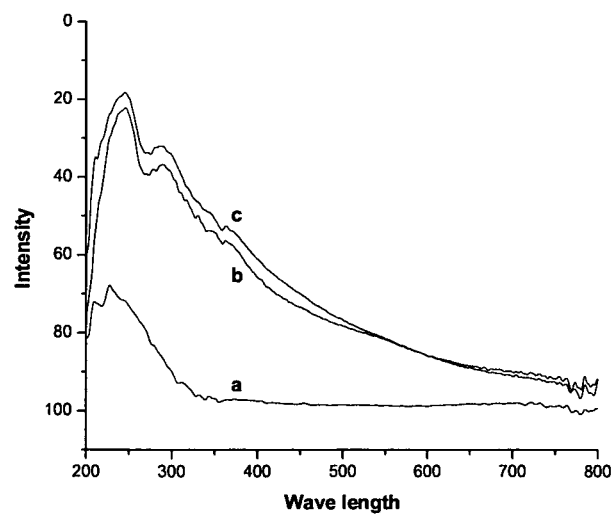
FIG. 16 Solid reflectance UV-Vis. spectra of calcined MCM-41(a), (S)-amino epoxy-support-41 (b) and (S)-amino alcohol-support-41 (c)
Figure 17:
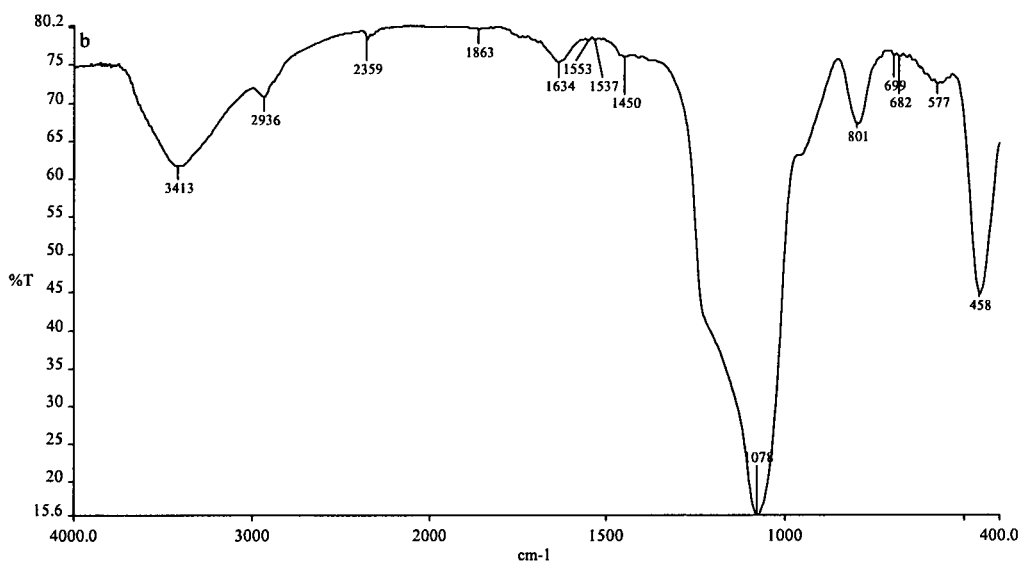
FIG. 17 FTIR spectra of (S)-amino epoxy-support 15 (b)
Figure 18:
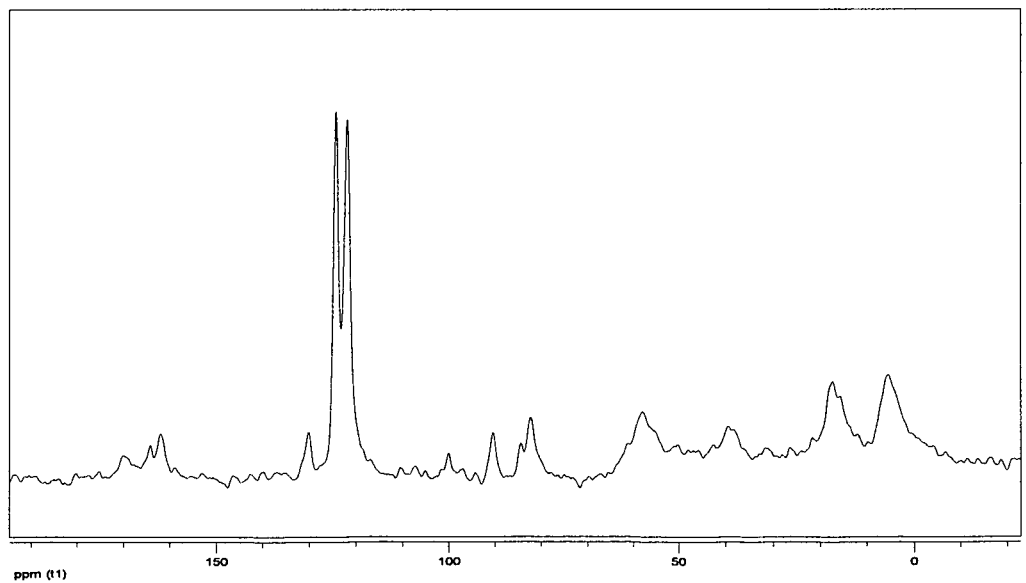
FIG. 18 Solid-state $^{13}$C CP-MAS NMR spectra of (S)-amino alcohol-support 15
Figure 19:
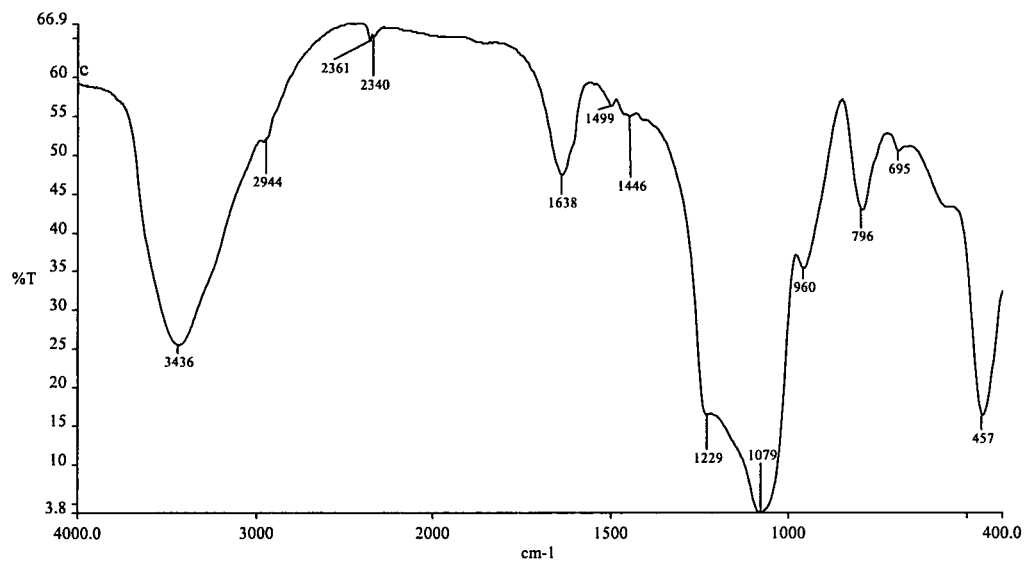
FIG. 19 FTIR spectra of (S)-amino alcohol-support 15 (c)
Figure 20:
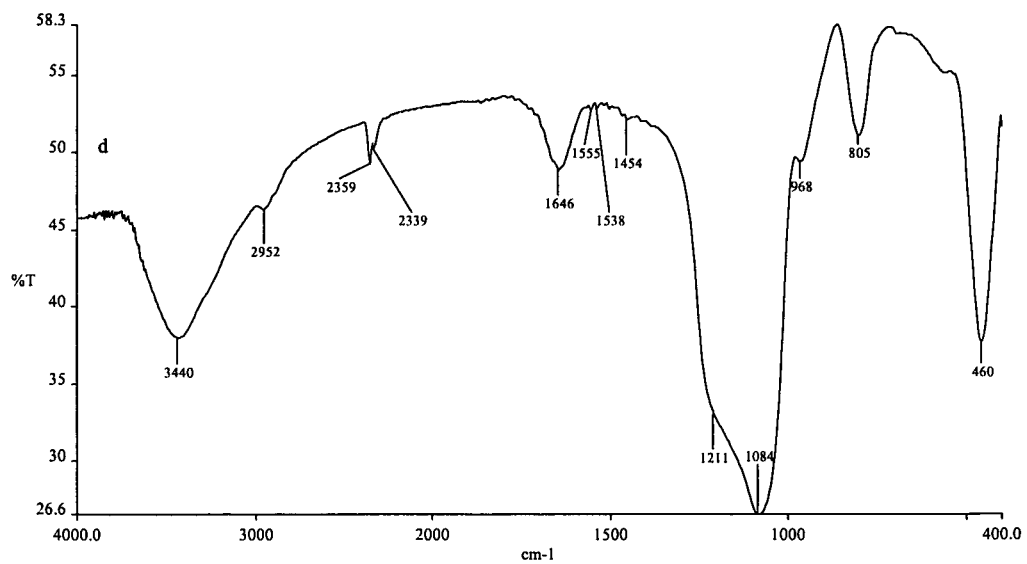
FIG. 20 FTIR spectra of (S)-amino alcohol-copper-support 15 (Catalyst 3) (d)
Figure 21:
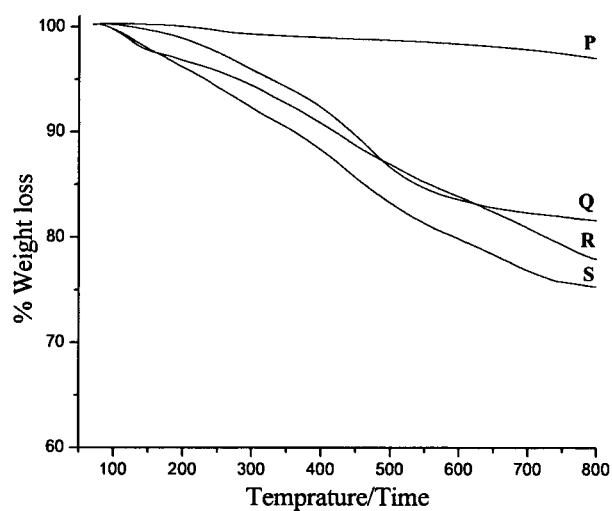
FIG. 21 TGA curve of calcined SBA-15 (P), (S)-amino epoxy-support-15 (Q), (S)-amino alcohol-support 15 (R) and (S)-amino alcohol-copper-support 15 (Catalyst 3) (S)
Figure 22:
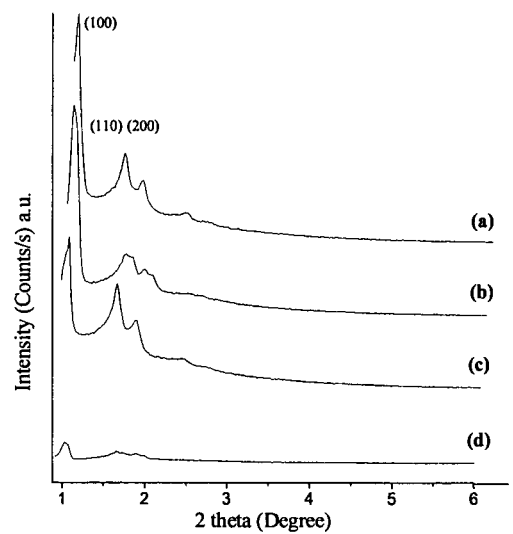
FIG. 22 Powder X-ray diffraction of calcined SBA-15 (a), (S)-amino epoxy-support-15 (b), (S)-amino alcohol-support 15 (c) and (S)-amino alcohol-copper-support 15 (Catalyst 3) (d).
Figure 23:
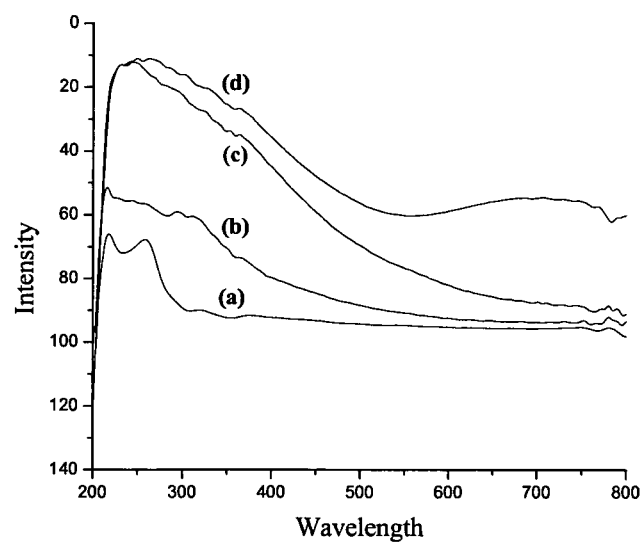
FIG. 23 Solid reflectance UV-Vis. spectra of calcined SBA-15 (a), (S)-amino epoxy-support-15 (b), (S)-amino alcohol-support 15 (c) and (S)-amino alcohol-copper-support 15 (Catalyst 3) (d)
Figure 24:
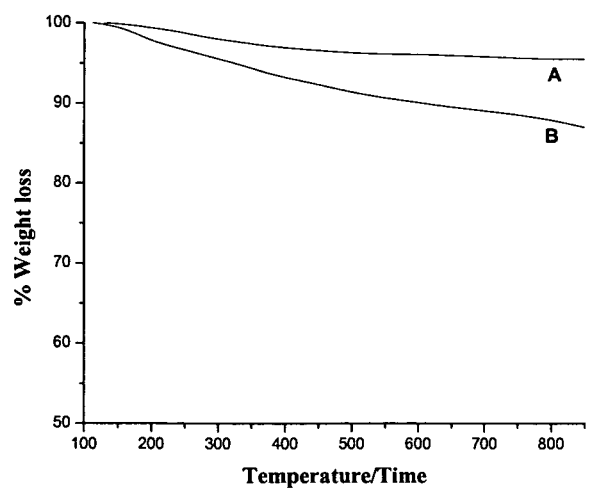
FIG. 24 TGA curve of calcined MCF (A) and (S)-aminopropyl alcohol-copper-support-Meso Cellular Foams (MCF) (Catalyst 5)
Figure 25:
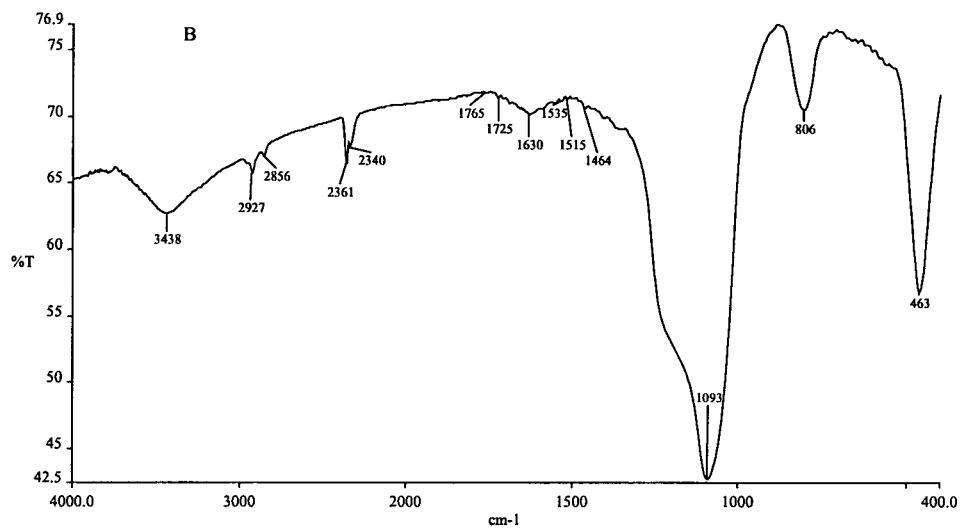
FIG. 25 FTIR spectra of (S)-aminopropyl alcohol-copper-support-Meso Cellular Foams (MCF) (Catalyst 5)
Figure 26:
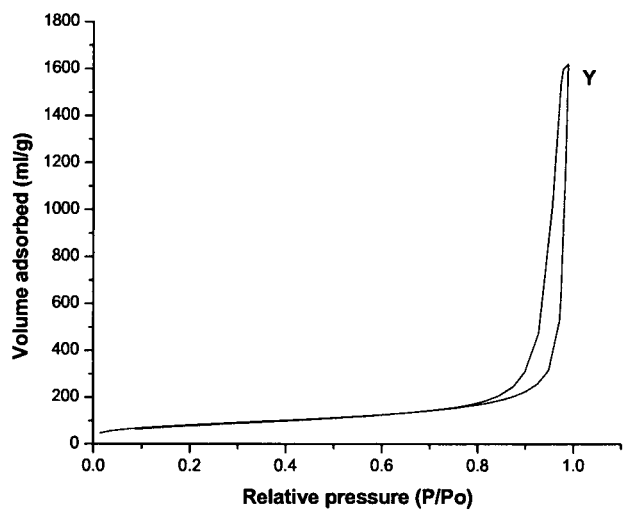
FIG. 26 Nitrogen adsorption-desorption isotherm of (S)-aminopropyl alcohol-copper-support-Meso Cellular Foams (MCF) (Catalyst 5)
Figure 27:
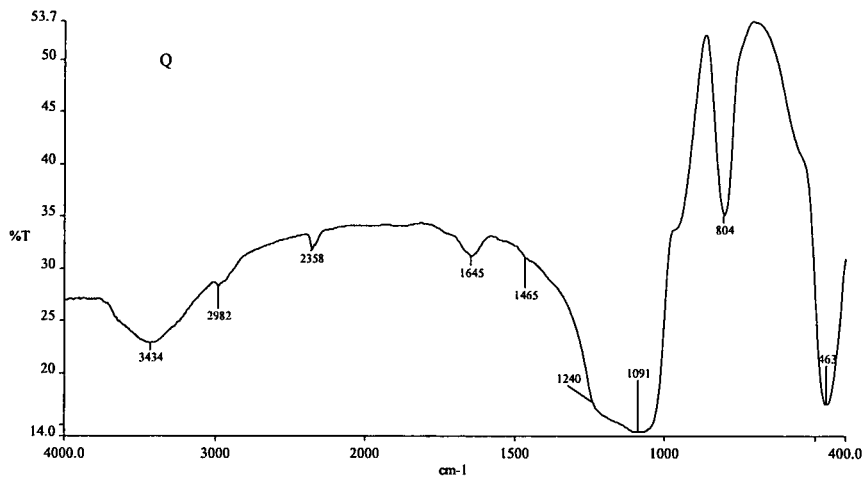
FIG. 27 FTIR spectra of (S)-amino epoxy-support-silica-gel (Q)
Figure 28:
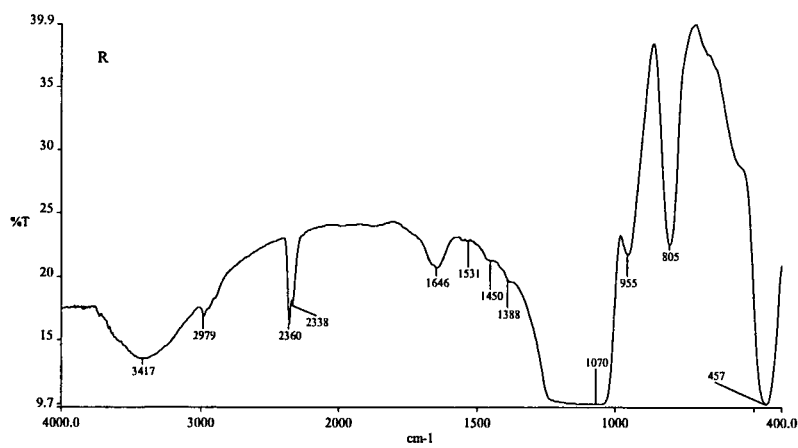
FIG. 28 FTIR spectra of (S)-amino alcohol-support-silica gel (R)
Figure 29:
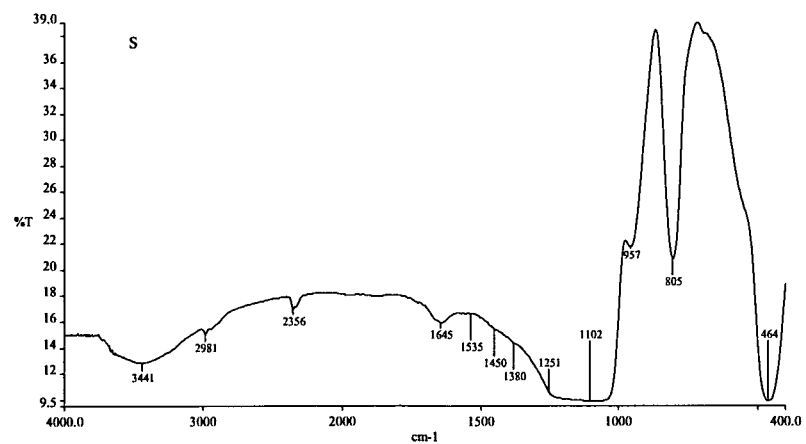
FIG. 29 FTIR spectra of (S)-amino alcohol-copper-support-silica gel (Catalyst 24) (S)
Figure 30:
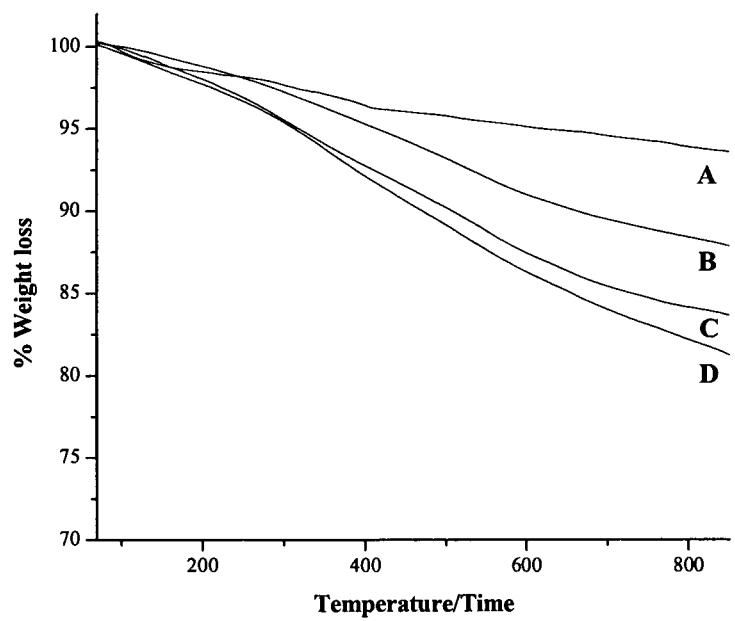
FIG. 30 TGA curve of calcined-standard silica (A), (S)-amino epoxy-support-silica gel (B), (S)-amino alcohol-support-silica gel (C) and (S)-amino alcohol-copper-support-silica gel (Catalyst 24) (D)

The chiral heterogeneous catalyst thus obtained was stirred with an appropriate aldehyde in an appropriate solvent containing an appropriate additive selected from the FIG. 6 and an appropriate nitroalkane for 40 h at 28° C. The completion of the reaction was monitored by thin layer chromatography (TLC). The mixture was filtered and washed with dry ethanol and dried over $MgSO_4$ then evaporated in vacuum. The residue was purified by column chromatography by using n-hexane/EtOAc (90:10) to give chiral nitroaldol product in high enantiomeric excess as determined by HPLC analysis using chiral column OD, OD-H and AD.

The present invention relates to the preparation of chiral compounds especially chiral nitro alcohols suitable for various applications. These chiral nitro alcohols were synthesized by asymmetric nitroaldol reaction of aldehydes and nitroalkane using heterogeneous chiral copper complex as catalyst in the presence of an organic base as an additive under inert gas atmosphere at 28±2° C. The chiral induction in the present asymmetric catalysis of aldehydes was found to be higher than that reported in literature where the asymmetric catalysis have some limitations; i) tedious, ii) catalyst is non-recoverable and non-reusable iii) catalytic reaction requires extremely low temperatures and, iv) time required for the completion of the catalytic reaction is very high. The inventive steps adopted in the present invention are (i) the reaction can be carried at temperature about 30° C. which dispense the need of maintaining very low temperature (−50° C.) for achieving higher conversion and enantioselectivity, (ii) the reaction time required is 40 h and it eliminates the need of having very long reaction time above 70 h, (iii) the catalyst used in the reaction can be separated, reused after normal washing without any loss in efficiency, up to 10 cycles, (iv) the reaction is carried out under dry condition and in a nitrogen atmosphere and (v) the reaction does not require any expensive metal sources in order to achieve higher conversion or enantioselectivity.

The novelty of the invention is that it is for the first time a novel recyclable heterogeneous copper catalyst derived from chiral amino alcohol is developed for asymmetric nitroaldol reaction at room temperature using chiral imines as additive. The following examples are given by way of illustration of the present invention and therefore should not be construed to limit the scope of the present invention.

Example 1

In a typical process for the preparation of novel asymmetric heterogeneous catalyst described in following Steps

Step 1

(2'S)—N-(2',3'-epoxypropyl)-3-(aminopropyl)-triethoxysilane (S)-(+)-epichlorohydrin (2.557 mmol), 3-aminopropyl triethoxysilane (2.557 mmol), potassium carbonate (5.1 mmol) and dry tetrahydrofuran (10 ml) were charged in a 3-necked 50 ml round bottom flask equipped with a mechanical stirrer, addition funnel and a reflux condenser connected to a gas inlet. The resulting mixture was stirred at 30° C. for 10 minutes and followed by refluxing the mixture at 65° C. for 12 h under nitrogen atmosphere. The reaction mixture was filtered under an inert atmosphere. Solvent from the filtrate was removed by the dry nitrogen draft, Yield; (95%). LCMS: 278 $[M+H]^+$, 302 $[M+Na]^+$. 262, 216, $^1$H NMR (200 MHz, $CDCl_3$): δ 0.63 (t, J=7.90, 2H), 1.22 (t, J=6.97, 3H), 1.48-1.63 (m, 2H), 1.85 (bs, NH), 2.67 (t, J=7.28, 2H), 2.77 (d, J=3.96, 1H), 2.82-2.88 (m, 1H), 3.55 (d, J=5.53, 1H), 3.69 (q, J=6.93, 13.95, 2H), 3.82 (q, J=6.99, 13.93, 2H,); $^{13}$C NMR spectroscopy (50 MHz, $CDCl_3$): δ (8.48, 18.86, 27.64, 45.47, 47.99, 52.61, 52.99, 58.97); FTIR (KBr): 3410, 2926, 1653, 1445, 1075, 776, 696 $cm^{-1}$; CHN analysis data C/H ratio calculated: 5.29, found: 5.21, C/N ratio calculated: 10.29, found: 12.42), Optical rotation $[α]_D^{27}$=+43.7° (C=0.35, Tetrahydrofuran).

Step 2

(S)-amino epoxy-support-41

The product of step 1 (2.0 mmol) was dissolved in dry toluene (15 ml) in a 3-necked 50 ml round bottom flask in an inert atmosphere. The dissolved mass was treated with Mobil Crystalline Materials-41 (MCM-41: XRD, $d_{100}$ 3.48; BET surface area: 1064 $m^2/g$; Pore volume: 0.942 $cm^3/g$; BJH pore diameter: 35.4 Å) (2.0 g) for 48 h at the refluxing temperature (110° C.) of toluene. The reaction mass was filtered and washed with dry toluene (4×10 ml) then dried under vacuum. The dried material was subjected to Soxhlet extraction with dry toluene (50 ml) for 10 h followed by drying the sample under normal vacuum, Yield; (2.0 g; loading amino-epoxy compound on Mobil Crystalline Materials-41 (MCM-41) was found to be 0.45 mmol/g). FTIR (KBr) 801, 1078, 1469, 1634, 2359, 2936, 3413 $cm^{-1}$, Solid reflectance UV-vis.: 230, 245, 290, nm.

Step 3

(S)-amino alcohol-support-41

The epoxy product from the step 2 (2.0 g) was treated with aniline (5.1 mmol) in 10 ml dry toluene in an inert atmosphere. The suspension was refluxed at 110° C. for 12 h. The reaction mixture was cooled to 28° C. and the solid was filtered, washed with dry toluene (5×10 ml) and subjected to Soxhlet extraction with toluene and iso-propanol (7:3; 50 ml) for 10 h. Finally the sample was dried under normal vacuum at 40° C., Yield; (2.0 g, loading of amino alcohol on MCM-41 was found to be 0.51 mmol/g). Solid-state $^{13}$C CP-MAS NMR (50 MHz), □ ppm 137 (aromatic carbons originated from aniline), 77-68 and 37-21 (alkyl carbons from epichlorohydrin modified aminopropyl chain), FTIR (KBr) 801, 961, 1082, 1445, 1499, 1600, 1630, 2361, 2937, 3429, 3776 $cm^{-1}$. CHN analysis (Found) C, 12.76; H, 2.14; N, 1.90% (C/N=6.71, C/H=5.96). Diffuse reflectance UV-vis: 230, 245, 290 nm.

Step 4

(S)-amino alcohol-copper-support-41 (Catalyst 1)

(S)-amino alcohol-support-41 from step 3 (2.0 g) and copper acetate monohydrate (2.0 mmol) were taken in absolute ethanol (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of amino alcohol on Mobil Crystalline Materials-41 (MCM-41) as determined by TGA was found to be 0.32 mmol/g, FT-IR (characteristic peaks), 3462, 2952, 2936, 1638, 1446 $cm^{-1}$. XRD: $d_{100}$, 3.44 nm; BET surface area: 659 $m^2/g$; Pore volume: 0.413 $cm^3/g$; BJH pore diameter: 33.1 Å.

Example 2

Step 1

(2'R)—N-(2',3'-epoxypropyl)-3-(aminopropyl)-triethoxysilane (R)-(-)-epichlorohydrin (2.557 mmol), 3-aminopropyl triethoxysilane (2.557 mmol), potassium carbonate (5.1 mmol) and dry tetrahydrofuran (15 ml) were reacted and processed in the manner it was done in step 1 of the example 1, Yield (96%).

Step 2

(R)-aminopropyl epoxy-support-41

The product of step 1 (2.0 mmol) of this example was dissolved in 15 ml dry toluene in 3-necked 50 ml round bottom flask in an inert atmosphere. Then this dissolved mass was treated with MCM-41 (MCM-41: XRD, $d_{100}$ 3.48; BET surface area: 1064 $m^2/g$; Pore volume: 0.942 $cm^3/g$; BJH pore diameter: 35.4 Å) (2.0 g) for 48 h. at refluxing temperature at 110° C. The reaction mixture was processed as per the method given in step 2 of the example 1. Yield; (2.0 g, loading of amino-epoxy compound on MCM-41 was found to be 0.45 mmol/g).

Step 3

(R)-aminopropyl alcohol-support-41

The epoxy product from the step 2 (2.0 g) of this example was treated with aniline (5.1 mmol) in 10 ml dry toluene in an inert atmosphere. The suspension was treated as per the method given in step 3 of the example 1. Yield; (2.0 g, loading of aminoalcohol on MCM-41 was found to be 0.51 mmol/g).

Step 4

(R)-aminopropyl alcohol-copper-support-41 (Catalyst 2)

(R)-amino alcohol-support-41 (2.0 g) and copper acetate monohydrate (2.0 mmol) were taken in absolute ethanol (10 ml) and the resulting suspension was stirred at 28° C. for 12 h.

Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on MCM-41 as determined by TGA was found to be 0.31 mmol/g) FT-IR (characteristic peaks), 3461, 2954, 2937, 1636, 1445 cm$^{-1}$. XRD: $d_{100}$, 3.42 nm; BET surface area: 655 m$^2$/g; Pore volume: 0.400 cm$^3$/g; BJH pore diameter: 32.8 Å

Example 3

Step 1

(2'S)—N-(2',3'-epoxypropyl)-3-(aminopropyl)-trimethoxysilane (S)-(+)-epibromohydrin (2.557 mmol), 3-aminopropyl trimethoxy silane (2.557 mmol), potassium carbonate (5.1 mmol) and dry diethyl ether (10 ml) were charged in a 3-necked 50 ml round bottom flask equipped with a mechanical stirrer, addition funnel and a reflux condenser connected to a nitrogen inlet. The resulting mixture was stirred at 30° C. for 10 minutes and followed by refluxing the mixture at 35° C. for 10 h. The reaction mixture was filtered under inert atmosphere. Solvent from the filtrate was removed by the dry nitrogen draft, Yield; (95%). LCMS: 278 [M+H]$^+$, 302 [M+Na]$^+$. 262, 216, $^1$H NMR (200 MHz, CDCl$_3$): δ 0.63 (t, J=7.90, 2H), 1.22 (t, J=6.97, 3H), 1.48-1.63 (m, 2H), 1.85 (bs, NH), 2.67 (t, J=7.28, 2H), 2.77 (d, J=3.96, 1H), 2.82-2.88 (m, 1H), 3.55 (d, J=5.53, 1H), 3.69 (q, J=6.93, 13.95, 2H), 3.82 (q, J=6.99, 13.93, 2H,); $^{13}$C NMR spectroscopy (50 MHz, CDCl$_3$): δ (8.48, 18.86, 27.64, 45.47, 47.99, 52.61, 52.99, 58.97); FTIR (KBr): 3410, 2926, 1653, 1445, 1075, 776, 696 cm$^{-1}$; CHN analysis data C/H ratio calculated: 5.29, found: 5.21, C/N ratio calculated: 10.29, found: 12.42), Optical rotation $[α]_D^{27}$=43.7° (C=0.35, Tetrahydrofuran).

Step 2

(S)-aminopropyl epoxy-support-15

The product of step 1 (2.0 mmol) of this example was dissolved in dry toluene (15 ml) in 3-necked 50 ml round bottom flask in an inert atmosphere. Then this dissolved mass was treated with Santa Barbara Amorphous-15 (SBA-15: BET surface area: 795 m$^2$/g; Pore volume: 1.289 cm$^3$/g; BJH pore diameter: 78.9 Å) (2.0 g) for 48 h at refluxing temperature at 110° C. The reaction mass was filtered and washed with dry toluene (5×10 ml) then dried under normal vacuum. The dried material was subjected to Soxhlet extraction with dry toluene (50 ml) for 10 h followed by drying the sample under normal vacuum. Yield; (2.0 g, loading of amino-epoxy compound on SBA-15 was found to be 0.48 mmol/g). FTIR (KBr): 458, 577, 682, 699, 801, 1078, 1450, 1537, 1553, 1637, 1863, 2359, 2936, 3413 cm$^{-1}$, CHN analysis (Found) C, 5.13; H, 1.36; N, 1.17% (C/N=4.39, C/H=3.77). Solid reflectance UV-vis.: 220, 290, 320, 370 nm.

Step 3

(S)-aminopropyl alcohol-support-15

The epoxy product from the step 2 (2.0 g) of this example was treated with aniline (5.1 mmol) in 10 ml dry toluene in an inert atmosphere. The suspension was refluxed at 110° C. for 12 h. The reaction mixture was cooled to 28° C. and the solid was filtered, washed with dry toluene (4×10 ml) and subjected to the soxhlet extraction with toluene and iso-propanol (7:3, 50 ml) for 10 h. Finally the sample was dried under normal vacuum at 40° C. Yield; (2.0 g, loading of aminoalcohol on SBA-15 was found to be 0.53 mmol/g). Solid-state $^{13}$C CP-MAS NMR (125 MHz), □ppm 164 (aromatic C—N) 130-121 (aromatic carbons), 90 (aliphatic C—OH) 84-58 (aliphatic C—N) 38-5 (alkyl carbons); FTIR (KBr): 457, 695, 796, 960, 1079, 1229, 1446, 1499, 1638, 2340, 2361, 2944, 3436 cm$^{-1}$. CHN analysis (Found) C, 6.23; H, 1.20; N, 1.58% (C/N=3.94, C/H=5.19). Diffuse reflectance UV-vis: 225, 240, 290, 375, 370 nm.

Step 4

(S)-aminopropyl alcohol-copper-support-15
(Catalyst 3)

(S)-amino alcohol-support-15 (2.0 g) from the step 3 of this example and copper acetate monohydrate (2.0 mmol) were taken in absolute ethanol (10 ml) and the resulting suspension was stirred at 28±2° C. for 12 h. Then the solvent was removed by filtration and the light greenish powder thus obtained was subjected to Soxhlet extraction with iso-propanol (50 ml) for 10 h, filtered and dried under vacuum at 110° C. for 24 h. The dried material was ground well and sieved using 400 mesh (0.037 mm) size test sieves. Yield: 2.1 g; Loading of copper complex of amino alcohol on SBA-15 as determined by TGA was found to be 0.33 mmol/g) FT-IR (characteristic peaks), 460, 805, 968, 1084, 1211, 1454, 1538, 1555, 1646, 2339, 2359, 2952, 3440 cm$^{-1}$. BET surface area: 257 m$^2$/g; Pore volume: 0.508 cm$^3$/g; BJH pore diameter: 60.8 Å. CHN analysis (Found) C, 6.96; H, 1.83; N, 1.06% (C/N=6.56, C/H=3.80). Solid reflectance UV-vis.: 225, 260, 370, 470, 650 nm.

Example 4

Step 1

(2'R)—N-(2',3'-epoxypropyl)-3-(aminopropyl)-tributoxysilane (R)-(−)-epichlorohydrin (2.557 mmol), 3-aminopropyl tributoxysilane (2.557 mmol), Sodium carbonate (5.1 mmol) and dry tetrahydrofuran (10 ml) were charged in a 3-necked 50 ml round bottom flask equipped with a mechanical stirrer, addition funnel and a reflux condenser connected to a nitrogen inlet. The resulting mixture was stirred at 30° C. for 10 minutes and followed by refluxing the mixture at 65° C. for 12 h. The reaction mixture was filtered under inert atmosphere. Solvent from the filtrate was removed by the dry nitrogen draft, Yield (94%).

Step 2

(R)-aminopropyl epoxy-support-15

The product of step 1 (2.0 mmol) of this example was dissolved in dry toluene (15 ml) in 3-necked 50 ml round bottom flask in an inert atmosphere. Then this dissolved mass was treated with SBA-15 (BET surface area: 795 m$^2$/g; Pore volume: 1.289 cm$^3$/g; BJH pore diameter: 78.9 Å) (2.0 g) for 48 h at refluxing temperature at 110° C. Reaction was further processed as per the step 2 of the example 3. Yield; (2.0 g, loading of amino-epoxy compound on Santa Barbara Amorphous-15 (SBA-15) was found to be 0.52 mmol/g).

Step 3

(R)-aminopropyl alcohol-support-15

The epoxy product from the step 2 (2.0 g) of this example was treated with aniline (5.1 mmol) in 10 ml dry toluene in an inert atmosphere. The suspension was refluxed at 110° C. for 12 h. The reaction mixture was cooled to 28° C. and the solid was filtered, washed with dry toluene (5×10 ml) and subjected to the soxhlet extraction with toluene and iso-propanol (7:3, 50 ml) for 10 h. Finally the sample was dried under normal vacuum at 40° C. Yield; (2.0 g, loading of aminoalcohol on SBA-15 was found to be 0.52 mmol/g).

Step 4

(R)-aminopropyl alcohol-copper-support-15 (Catalyst 4)

(R)-amino alcohol-support-15 (2.0 g) obtained from the step 3 of this example and copper acetate monohydrate (2.0 mmol) were taken in absolute ethanol (10 ml) and the resulting suspension was stirred at 28±2° C. for 12 h. Then the solvent was removed by filtration and the light greenish powder thus obtained was subjected to Soxhlet extraction with iso-propanol (50 ml) for 10 h, filtered and dried normal under vacuum at 110° C. for 24 h. The dried material was ground well and sieved using 400 mesh (0.037 mm) size test sieves. Yield: 2.1; Loading of copper complex of aminoalcohol on SBA-15 as determined by TGA was found to be 0.33 mmol/g. FT-IR (characteristic peaks), 3464, 2954, 2938, 1639, 1445 cm$^{-1}$. BET surface area: 367 m$^2$/g; Pore volume: 0.512 cm$^3$/g; BJH pore diameter: 61.4 Å

Example 5

Step 1

(2'S)—N-(2',3'-epoxypropyl)-3-(aminopropyl)-trimethoxysilane

Synthesized as per the method given in step 1 of the example 1

Step 2

(S)-aminopropyl epoxy-support-Meso Cellular Foams (MCF)

The product of step 1 (2.0 mmol) of this example was dissolved in dry toluene (15 ml) in 3-necked 50 ml round bottom flask in an inert atmosphere. Then this dissolved mass was treated with MCF (BET surface area: 770 m$^2$/g; Pore volume: 2.299 cm$^3$/g; BJH pore diameter: 119.4 Å) (2.0 g) for 48 h at refluxing temperature at 110° C. The reaction mass was filtered and washed with dry toluene (4×10 ml) then dried under vacuum. The dried material was subjected to Soxhlet extraction with dry toluene (50 ml) for 10 h followed by drying the sample under normal vacuum. Yield; (2.0 g, loading of amino-epoxy compound on MCF was found to be 0.54 mmol/g).

Step 3

(S)-aminopropyl alcohol-support-Meso Cellular Foams (MCF)

The epoxy product from the step 2 (2.0 g) of this example was treated with aniline (5.1 mmol) in 10 ml dry toluene in an inert atmosphere. The suspension was refluxed at 110° C. for 12 h. The reaction mixture was cooled to 28° C. and the solid was filtered, washed with dry toluene (5×10 ml) and subjected to the soxhlet extraction with toluene and isopropanol (7:3, 50 ml) for 10 h. Finally the sample was dried under normal vacuum at 40° C. Yield; (2.0 g, loading of aminoalcohol on MCF was found to be 0.55 mmol/g).

Step 4

(S)-aminopropyl alcohol-copper-support-Meso Cellular Foams (MCF) (Catalyst 5)

(S)-amino alcohol-support-Meso Cellular Foams (MCF) (2.0 g) obtained from step 3 of this example and copper acetate monohydrate (2.0 mmol) were taken in absolute ethanol (10 ml) and the resulting suspension was stirred at 28° C. C for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on Meso Cellular Foams (MCF) as determined by TGA was found to be 0.31 mmol/g. FT-IR (characteristic peaks) 463, 806, 1093, 1464, 1515, 1535, 1636, 1725, 1765, 2340, 2361, 2856, 2927, 3438 cm$^{-1}$. BET surface area: 298 m$^2$/g; Pore volume: 0.819 cm$^3$/g; BJH pore diameter: 109.7 Å. Solid reflectance UV-vis.: 220, 260, 310, 370, 400, 520, 530 nm. CHN analysis (Found) C, 6.12; H, 0.98; N, 0.50% (C/N=12.24, C/H=6.24).

Example 6

Step 1

(2'R)—N-(2',3'-epoxypropyl)-3-(aminopropyl)-trimethoxysilane

This material was synthesized as per the method described in step 1 of the example 2.

Step 2

(R)-aminopropyl epoxy-support-Meso Cellular Foams (MCF)

The product of step 1 (2.0 mmol) of this example was dissolved in dry toluene (15 ml) in 3-necked 50 ml round bottom flask in an inert atmosphere. Then this dissolved mass was treated with MCF (2.0 g) and processed as per the method of step 2 of example 5, Yield; (2.0 g, loading of amino-epoxy compound on MCF was found to be 0.53 mmol/g).

Step 3

(R)-aminopropyl alcohol-support-MCF

The epoxy product from the step 2 (2.0 g) of this example was treated with aniline (5.1 mmol) in 10 ml dry toluene in an inert atmosphere and the reaction was processed as per the step 3 of the example 5, Yield; (2.0 g, loading of aminoalcohol on MCF was found to be 0.54 mmol/g).

Step 4

(R)-aminopropyl alcohol-copper-support-MCF (Catalyst 6)

(R)-amino alcohol-support-MCF (2.0 g) obtained from step 3 of this example and copper acetate monohydrate (2.0 mmol) were taken in absolute ethanol (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on MCF as determined by TGA was found to be 0.30 mmol/g. FT-IR (characteristic peaks), 3460, 2953, 2935, 1637, 1445 cm$^{-1}$. BET surface area: 303 m$^2$/g; Pore volume: 0.839 cm$^3$/g; BJH pore diameter: 108.7 Å

Example 7

Step 1

(2'S)—N'-(2',3'-epoxypropyl)-3-(N-methylaminopropyl)-trimethoxysilane (S)-(+)-epichlorohydrin (2.557 mmol), 3-N-methylaminopropyl trimethoxy silane (2.557 mmol), potassium carbonate (5.1 mmol) and dry toluene (10 ml) were charged in a 3-necked 50 ml round bottom flask equipped with a mechanical stirrer, addition funnel and a reflux condenser connected to a nitrogen inlet. The resulting mixture was stirred at 28° C. for 10 minutes and followed by refluxing the mixture at 110° C. for 16 h. The reaction mixture was filtered under inert atmosphere. Solvent from the filtrate was removed by the dry nitrogen draft: yield (96%).

Step 2

(S)—N-methyl aminopropyl epoxy-support-41

The product of step 1 (2.0 mmol) of this example was dissolved in dry toluene (15 ml) in 3-necked 50 ml round bottom flask in an inert atmosphere. The reaction mixture was treated with MCM-41 (XRD, d$_{100}$ 3.48; BET surface area: 1064 m$^2$/g; Pore volume: 0.942 cm$^3$/g; BJH pore diameter: 35.4 Å) (2.0 g) for 48 h. at the refluxing temperature at 110° C. of toluene. The reaction mass was filtered and washed with dry toluene (5×10 ml) then dried under normal vacuum. The dried material was subjected to Soxhlet extraction with dry toluene (50 ml) for 10 h followed by drying the sample under normal vacuum. Yield; (2.0 g, loading of amino-epoxy compound on MCM-41 was found to be 0.41 mmol/g).

Step 3

(S)—N-methyl aminopropyl alcohol-support-41

The epoxy product (2.0 g) from the step 2 of this example was treated with aniline (5.1 mmol) in 10 ml dry toluene in an inert atmosphere. The suspension was refluxed at 110° C. for 12 h. The reaction mixture was cooled to 28° C. and the solid was filtered, washed repeatedly with dry toluene (5×10 ml) and subjected to the soxhlet extraction with toluene and iso-propanol (7:3, 50 ml) for 10 h. Finally the sample was dried under normal vacuum at 40° C. Yield; (2.0 g, loading of aminoalcohol on MCM-41 was found to be 0.51 mmol/g).

Step 4

(S)—N-methyl aminopropyl alcohol-copper-support-41 (Catalyst 7)

(S)—N-methyl aminopropyl alcohol-support-41 (2.0 g) obtained from the step 3 of this example and copper acetate monohydrate (2.0 mmol) were taken in absolute ethanol (10 ml) and the resulting suspension was stirred at 28±2° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on MCM-41 as determined by TGA was found to be, 0.31 mmol/g. FT-IR (characteristic peaks), 3461, 2956, 2934, 1639, 1446 cm$^{-1}$. XRD: d$_{100}$, 3.57 nm; BET surface area: 652 m$^2$/g; Pore volume: 0.403 cm$^3$/g; BJH pore diameter: 33.3 Å

Example 8

Step 1

(2'S)—N-(2',3'-epoxypropyl)-3-(aminopropyl)-trimethoxysilane

Synthesized as per the method given in step 1 of the example 1.

Step 2

(S)-aminopropyl epoxy-support-MCF

The product of step 1 (2.0 mmol) of this example was dissolved in dry xylene (15 ml) in 3-necked 50 ml round bottom flask in an inert atmosphere. Then this dissolved mass was treated with MCF (2.0 g) for 48 h at refluxing temperature at 140° C. The reaction mass was filtered and washed with dry toluene (5×10 ml) then dried under normal vacuum. The dried material was subjected to Soxhlet extraction with dry toluene (50 ml) for 10 h followed by drying the sample under normal vacuum. Yield; (2.0 g, loading of amino-epoxy compound on MCF was found to be 0.54 mmol/g).

Step 3

(S)—N-methyl aminopropyl alcohol-support-MCF

The epoxy product from the step 2 (2.0 g) of this example was treated with N-methyl aniline (5.1 mmol) in 10 ml dry xylene in an inert atmosphere. The suspension was refluxed at 140° C. for 12 h. The reaction mixture was cooled to 28° C. and the solid was filtered, washed with dry toluene (5×10 ml) and subjected to the soxhlet extraction with toluene and iso-propanol (7:3, 50 ml) for 10 h. Finally the sample was dried under normal vacuum at 40° C. Yield; (2.0 g, loading of aminoalcohol on MCF was found to be 0.55 mmol/g).

Step 4

(S)—N-methyl aminopropyl alcohol-copper-support-MCF (Catalyst 8)

(S)—N-methyl amino alcohol-support-Meso Cellular Foams (MCF) (2.0 g) obtained from step 3 of this example and copper acetate monohydrate (2.0 mmol) were taken in dichloromethane (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under vacuum at 110° C. for 24 h. The dried material was ground well and sieved using 400 mesh (0.037 mm) size test sieves. Yield: 2.1 g; Loading of copper complex of aminoalcohol on Meso Cellular Foams (MCF) as determined by TGA was found to be 0.31 mmol/g. FT-IR (characteristic peaks), 3463, 2958, 2935, 1636, 1449 cm$^{-1}$. BET surface area: 288 m$^2$/g; Pore volume: 0.823 cm$^3$/g; BJH pore diameter: 110.4 Å

Example 9

Step 1

(2'R)—N'-(2',3'-epoxypropyl)-3-(N-methylaminopropyl)-trimethoxysilane (R)-(−)-epichlorohydrin (2.557 mmol), 3-N-methylaminopropyl trimethoxy silane (2.557 mmol), potassium carbonate (5.1 mmol) and dry acetone (10 ml) were charged in a 3-necked 50 ml round bottom flask equipped with a mechanical stirrer, addition funnel and a reflux condenser connected to a nitrogen inlet. The resulting mixture was stirred at 28° C. for 10 minutes followed by refluxing the mixture at 56° C. for 16 h. The reaction mixture was filtered under an inert atmosphere. Solvent from the filtrate was removed by the dry nitrogen draft: yield (96%).

Step 2

(R)—N-methyl aminopropyl epoxy-support-41

The product of step 1 (2.0 mmol) of this example was dissolved in dry toluene (15 ml) in 3-necked 50 ml round bottom flask in an inert atmosphere. The reaction mixture was treated with MCM-41 (XRD, d$_{100}$ 3.48; BET surface area: 1064 m$^2$/g; Pore volume: 0.942 cm$^3$/g; BJH pore diameter: 35.4 Å) (2.0 g) for 48 h. at the refluxing temperature at 110° C. of toluene. The reaction mass was filtered and washed with dry toluene (4×10 ml) then dried under normal vacuum. The dried material was subjected to Soxhlet extraction with dry toluene (50 ml) for 10 h followed by drying the sample under normal vacuum. Yield; (2.0 g, loading of amino-epoxy compound on MCM-41 was found to be 0.41 mmol/g).

Step 3

(R)—N-methyl aminopropyl alcohol-support-41

The epoxy product (2.0 g) from the step 2 of this example was treated with aniline (5.1 mmol) in 10 ml dry toluene in an inert atmosphere. The suspension was refluxed at 110° C. for 12 h. The reaction mixture was cooled to 28° C. and the solid was filtered, washed with dry toluene (4×10 ml) and subjected to the soxhlet extraction with toluene and iso-propanol (7:3, 50 ml) for 10 h. Finally the sample was dried under normal vacuum at 40° C. Yield; (2.0 g, loading of aminoalcohol on MCM-41 was found to be 0.51 mmol/g).

Step 4

(R)—N-methyl aminopropyl alcohol-copper-support-41 (Catalyst 9)

(S)—N-methyl aminopropyl alcohol-support-41 (2.0 g) obtained from the step 3 of this example and copper acetate monohydrate (2.0 mmol) were taken in absolute ethanol (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of amino alcohol on MCM-41 as determined by TGA is found to be 0.31 mmol/g) FT-IR (characteristic peaks), 3463, 2959, 2938, 1638, 1447 cm$^{-1}$. XRD: d$_{100}$, 3.62 nm; BET surface area: 649 m$^2$/g; Pore volume: 0.411 cm$^3$/g; BJH pore diameter: 32.9 Å

Example 10

Step 1

(2R)—N'-(2',3'-epoxypropyl)-3-(N-methylaminoaminopropyl)-trimethoxysilane (R)-(−)-epichlorohydrin (2.557 mmol), 3-N-methylaminopropyl trimethoxysilane (2.557 mmol), sodium carbonate (5.1 mmol) and dry methanol (10 ml) were charged in a 3-necked 50 ml round bottom flask equipped with a mechanical stirrer, addition funnel and a reflux condenser connected to a nitrogen inlet. The resulting mixture was stirred at 28° C. for 10 minutes and followed by refluxing the mixture at 65° C. for 16 h. The reaction mixture was filtered under inert atmosphere. Solvent from the filtrate was removed by the dry nitrogen draft, Yield (97%).

Step 2

(R)—N-methyl aminopropyl epoxy-support-41

The product of step 1 (2.0 mmol) of this example was dissolved in dry toluene (15 ml) in 3-necked 50 ml round bottom flask in an inert atmosphere. Then this dissolved mass was treated with MCM-41 (XRD, d$_{100}$ 3.48; BET surface area: 1064 m$^2$/g; Pore volume: 0.942 cm$^3$/g; BJH pore diameter: 35.4 Å) (2.0 g) in the manner described in step 2 of the example 7. Yield; (2.0 g, loading of amino-epoxy compound on MCM-41 was found to be 0.42 mmol/g).

Step 3

(R)—N-methyl aminopropyl alcohol-support-41

The epoxy product from the step 2 (2.0 g) of this example was treated with 4-methylaniline (5.1 mmol) in 10 ml dry toluene in an inert atmosphere. The reaction was processed as per the method described in step 3 of the example 7. Yield (2.0 g, loading of aminoalcohol on MCM-41 was found to be 0.50 mmol/g).

Step 4

(R)—N-methyl aminopropyl alcohol-copper-support-41 (Catalyst 10)

(R)—N-methyl aminopropyl alcohol-support-41 (2.0 g) as obtained from the step 3 of this example and copper acetate monohydrate (2.0 mmol) were taken in absolute ethanol (10 ml) and the resulting suspension was stirred at 28±2° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on MCM-41 as determined by TGA was found to be 0.30 mmol/g. FT-IR (characteristic peaks), 3459, 2960, 2939, 1640, 1449 cm$^{-1}$. XRD: $d_{100}$, 3.49 nm; BET surface area: 653 m$^2$/g; Pore volume: 0.407 cm$^3$/g; BJH pore diameter: 33.1 Å

Example 11

Step 1

(2'R)—N'-(2',3'-epoxypropyl)-3-(N-methylami-noaminopropyl)-trimethoxysilane (R)-(−)-epichlorohydrin (2.557 mmol), 3-N-methylami-nopropyl trimethoxysilane (2.557 mmol), sodium carbonate (5.1 mmol) and dry acetonitrile (10 ml) were charged in a 3-necked 50 ml round bottom flask equipped with a mechanical stirrer, addition funnel and a reflux condenser connected to a nitrogen inlet. The resulting mixture was stirred at 28° C. for 10 minutes and followed by refluxing at 82° C. the mixture for 16 h. The reaction mixture was filtered under inert atmosphere. Solvent from the filtrate was removed by the dry nitrogen draft, Yield (97%).

Step 2

(R)—N-methyl aminopropyl epoxy-support-silica gel

The product of step 1 (2.0 mmol) of this example was dissolved in dry xylene (15 ml) in 3-necked 50 ml round bottom flask in an inert atmosphere. Then this dissolved mass was treated with silica gel (2.0 g; BET surface area: 412 m$^2$/g; Pore volume: 0.651 cm$^3$/g; BJH pore diameter: 69.8 Å) in the manner described in step 2 of the example 7. Yield; (2.0 g, loading of amino-epoxy compound on silica gel was found to be 0.42 mmol/g).

Step 3

(R)—N-methyl aminopropyl alcohol-support-silica gel

The epoxy product from the step 2 (2.0 g) of this example was treated with aniline (5.1 mmol) in 10 ml dry toluene in an inert atmosphere. The reaction was processed as per the method described in step 3 of the example 7. Yield (2.0 g, loading of aminoalcohol on silica gel was found to be 0.50 mmol/g).

Step 4

(R)—N-methyl aminopropyl alcohol-copper-support-silica gel (Catalyst 11)

(R)—N-methyl aminopropyl alcohol-support-41 (2.0 g) as obtained from the step 3 of this example and copper acetate monohydrate (2.0 mmol) were taken in diethylether (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on silica gel as determined by TGA was found to be 0.30 mmol/g. FT-IR (characteristic peaks), 3460, 2955, 2935, 1641, 1444 cm$^{-1}$. BET surface area: 340 m$^2$/g; Pore volume: 0.542 cm$^3$/g; BJH pore diameter: 62.7 Å

Example 12

Step 1

(2'R)—N'-(2',3'-epoxypropyl)-3-(N-methylami-noaminopropyl)-trimethoxysilane (R)-(−)-epichlorohydrin (2.557 mmol), 3-N-methylami-nopropyl trimethoxysilane (2.557 mmol), sodium carbonate (5.1 mmol) and dry acetone (10 ml) were charged in a 3-necked 50 ml round bottom flask equipped with a mechanical stirrer, addition funnel and a reflux condenser connected to a nitrogen inlet. The resulting mixture was stirred at 28° C. for 10 minutes and followed by refluxing the mixture at 56° C. for 16 h. The reaction mixture was filtered under inert atmosphere. Solvent from the filtrate was removed by the dry nitrogen draft, Yield (97%).

Step 2

(R)—N-methyl aminopropyl epoxy-support-MCF

The product of step 1 (2.0 mmol) of this example was dissolved in dry acetonitrile (15 ml) at 140° C. in 3-necked 50 ml round bottom flask in inert atmosphere. Then this dissolved mass was treated with MCF (BET surface area: 770 m$^2$/g; Pore volume: 2.299 cm$^3$/g; BJH pore diameter: 119.4 Å) (2.0 g) in the manner described in step 2 of the example 7. Yield; (2.0 g, loading of amino-epoxy compound on MCF was found to be 0.42 mmol/g).

Step 3

(R)—N-methyl aminopropyl alcohol-support-MCF

The epoxy product from the step 2 (2.0 g) of this example was treated with aniline (5.1 mmol) in 10 ml dry toluene in an inert atmosphere. The reaction was processed as per the method described in step 3 of the example 7. Yield (2.0 g, loading of aminoalcohol on MCF was found to be 0.50 mmol/g).

Step 4

(R)—N-methyl aminopropyl alcohol-copper-support-MCF (Catalyst 12)

(R)—N-methyl aminopropyl alcohol-support-41 (2.0 g) as obtained from the step 3 of this example and copper acetate monohydrate (2.0 mmol) were taken in dichloromethane (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on MCF as determined by TGA was found to be 0.30 mmol/g. FT-IR (characteristic peaks), 3461, 2956, 2934, 1639, 1446 cm$^{-1}$. BET surface area: 386 m$^2$/g; Pore volume: 0.823 cm$^3$/g; BJH pore diameter: 109.4 Å

Example 13

Step 1

(2'S)—N'-(2',3'-epoxypropyl)-3-(N-methylaminopropyl)-trimethoxysilane

This material was synthesized by following the method given in step 1 of the example 7.

Step 2

(S)—N-methyl aminopropyl epoxy-support-15

The product of step 1 (2.0 mmol) of this example was dissolved in dry toluene (15 ml) in 3-necked 50 ml round bottom flask in an inert atmosphere. Then this dissolved mass was treated with SBA-15 (BET surface area: 795 m$^2$/g; Pore volume: 1.289 cm$^3$/g; BJH pore diameter: 78.9 Å) (2.0 g) for 48 h at refluxing temperature at 110° C. The reaction mass was filtered and washed with dry toluene (5×10 ml) then dried under normal vacuum. The dried material was subjected to Soxhlet extraction with dry toluene (50 ml) for 10 h followed by drying the sample under normal vacuum. Yield; (2.0 g, loading of amino-epoxy compound on SBA-15 was found to be 0.47 mmol/g).

Step 3

(S)—N-methyl amino alcohol-support-15

The epoxy product from the step 2 (2.0 g) of this example was treated with aniline (5.1 mmol) in 10 ml dry toluene in an inert atmosphere. The suspension was refluxed at 110° C. for 12 h. The reaction mixture was cooled to 28° C. and the solid was filtered, washed with dry toluene (5×10 ml) and subjected to the soxhlet extraction with toluene and iso-propanol (7:3, 50 ml) for 10 h. Finally the sample was dried under normal vacuum at 40° C. Yield; (2.0 g, loading of aminoalcohol on SBA-15 was found to be 0.54 mmol/g).

Step 4

(S)—N-methyl aminopropyl alcohol-copper-support-15 (Catalyst 13)

(S)—N-methyl aminopropyl alcohol-support-15 (2.0 g) as obtained from the step 3 of this example and copper acetate monohydrate (2.0 mmol) were taken in absolute ethanol (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on Santa Barbara Amorphous-15 (SBA-15) as determined by TGA was found to be 0.33 mmol/g. FT-IR (characteristic peaks), 3466, 2959, 2930, 1635, 1448 cm$^{-1}$. BET surface area: 256 m$^2$/g; Pore volume: 0.492 cm$^3$/g; BJH pore diameter: 61.3 Å

Example 14

Step 1

(2'S)—N'-(2',3'-epoxypropyl)-3-(N-methylaminopropyl)-trimethoxysilane

This material was prepared by the method described in the step 1 of the example 7.

Step 2

(S)—N-methyl aminopropyl epoxy-support-41

This material was prepared by following the procedure given in step 2 of the example 7.

Step 3

(S)—N,N'dimethyl aminopropyl alcohol-support-41

The epoxy product from the step 2 (2.0 g) of this example was treated with N-methylaniline (5.1 mmol) in 10 ml dry toluene in an inert atmosphere. The suspension was refluxed at 110° C. for 18 h. The reaction mixture was cooled to 28° C. and the solid was filtered, washed with dry toluene (5×10 ml) and subjected to the soxhlet extraction with toluene and iso-propanol (7:3, 50 ml) for 10 h. Finally the sample was dried under normal vacuum at 40° C. Yield; (2.0 g, loading of aminoalcohol on MCM-41 was found to be 0.47 mmol/g).

Step: 4

(S)—N,N'-methyl aminopropyl alcohol-copper-support-41(Catalyst 14)

(S)—N,N'-methyl aminopropyl alcohol-support-41 (2.0 g) as obtained from the step 3 of this example and copper acetate monohydrate (2.0 mmol) were taken in absolute ethanol (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on MCM-41 as determined by TGA was found to be 0.32 mmol/g. FT-IR (characteristic peaks), 3460, 2954, 2935, 1636, 1449 cm$^{-1}$. XRD: 3.66 nm; BET surface area: 649 m$^2$/g; Pore volume: 0.399 cm$^3$/g; BJH pore diameter: 32.8 Å

Example 15

Step 1

(2'S)—N'-(2',3'-epoxypropyl)-3-(N-methylaminopropyl)-trimethoxysilane

This material was prepared by the method described in the step 1 of the example 7.

Step 2

(S)—N-methyl aminopropyl epoxy-support-41

This material was prepared by following the procedure given in step 2 of the example 7.

Step 3

(S)—N-methyl amino alcohol-support-41

The epoxy product from the step 2 (2.0 g) of this example was treated with 4-methyl aniline (5.1 mmol) in 10 ml dry toluene in an inert atmosphere. The suspension was refluxed at 110° C. for 18 h. The reaction mixture was cooled to 28° C. and the solid was filtered, washed with dry toluene (4×10 ml) and subjected to the soxhlet extraction with toluene and iso-propanol (7:3, 50 ml) for 10 h. Finally the sample was dried under normal vacuum at 40° C. Yield; (2.0 g, loading of aminoalcohol on MCM-41 was found to be 0.47 mmol/g).

Step 4

(S)—N-methyl aminopropyl alcohol-copper-support-41 (Catalyst 15)

(S)—N-methyl aminopropyl alcohol-support-41 (2.0 g) as obtained from step 3 of this example and copper acetate monohydrate (2.0 mmol) were taken in absolute ethanol (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on MCM-41 as determined by TGA was found to be 0.30 mmol/g. FT-IR (characteristic peaks), 3466, 2953, 2936, 1635, 1442 cm$^{-1}$. XRD: $d_{100}$, 3.45 nm; BET surface area: 658 m$^2$/g; Pore volume: 0.443 cm$^3$/g; BJH pore diameter: 33.4 Å

Example 16

Step 1

(2'S)—N'-(2',3'-epoxypropyl)-3-(N-methylaminopropyl)-trimethoxysilane

This material was prepared by the method described in the step 1 of the example 7.

Step 2

(S)—N-methyl aminopropyl epoxy-support-41

This material was prepared by following the procedure given in step 2 of the example 7.

Step 3

(S)—N-methyl aminopropyl alcohol-support-41

The epoxy product from the step 2 (2.0 g) of this example was treated with 4-chloro aniline (5.1 mmol) in 10 ml dry toluene in an inert atmosphere. The suspension was refluxed at 110° C. for 18 h. The reaction mixture was cooled to 28° C. and the solid was filtered, washed with dry toluene (5×10 ml) and subjected to the soxhlet extraction with toluene and iso-propanol (7:3, 50 ml) for 10 h. Finally the sample was dried under normal vacuum at 40° C. Yield; (2.0 g, loading of aminoalcohol on MCM-41 was found to be 0.47 mmol/g).

Step 4

(S)—N-methyl aminopropyl alcohol-copper-support-41(Catalyst 16)

(S)—N-methyl aminopropyl alcohol-support-41 (2.0 g) as obtained from the step 3 of this example and copper acetate monohydrate (2.0 mmol) were taken in absolute ethanol (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on MCM-41 as determined by TGA was found to be 0.32 mmol/g. FT-IR (characteristic peaks), 3464, 2953, 2933, 1640, 1449 cm$^{-1}$. XRD: $d_{100}$, 3.38 nm; BET surface area: 660 m$^2$/g; Pore volume: 0.414 cm$^3$/g; BJH pore diameter: 33.1 Å

Example 17

Step 1

(2'S)—N'-(2',3'-epoxypropyl)-3-(N-methylaminopropyl)-trimethoxysilane

This material was prepared by the method described in the step 1 of the example 7.

Step 2

(S)—N-methyl aminopropyl epoxy-support-41

This material was prepared by following the procedure given in step 2 of the example 7.

Step 3

(S)—N-methyl aminopropyl alcohol-support-41

The epoxy product from the step 2 (2.0 g) of this example was treated with 4-methoxy aniline (5.1 mmol) in 10 ml dry toluene in an inert atmosphere. The suspension was refluxed at 110° C. for 18 h. The reaction mixture was cooled to 28° C.

and the solid was filtered, washed with dry toluene (4×10 ml) and subjected to the soxhlet extraction with toluene and iso-propanol (7:3, 50 ml) for 10 h. Finally the sample was dried under normal vacuum at 40° C. Yield; (2.0 g, loading of aminoalcohol on MCM-41 was found to be 0.47 mmol/g).

Step 4

(S)—N-methyl aminopropyl alcohol-copper-support-41 (Catalyst 17)

(S)—N-methyl aminopropyl alcohol-support-41 (2.0 g) from the step 3 of this example and copper acetate monohydrate (2.0 mmol) were taken in absolute ethanol (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on MCM-41 as determined by TGA was found to be 0.32 mmol/g. FT-IR (characteristic peaks), 3461, 2956, 2934, 1639, 1446 cm$^{-1}$. XRD: d$_{100}$, 3.33 nm; BET surface area: 678 m$^2$/g; Pore volume: 0.440 cm$^3$/g; BJH pore diameter: 33.0 Å

Example 18

Step 1

(2'S)—N'-(2',3'-epoxypropyl)-3-(N-methylaminopropyl)-trimethoxysilane

This material was prepared by the method described in the step 1 of the example 5.

Step 2

(S)-aminopropyl epoxy-support-MCF

This material was prepared by following the procedure given in step 2 of the example 5.

Step 3

(S)-aminopropyl alcohol-support-MCF

The epoxy product from the step 2 (2.0 g) of this example was treated with 4-methoxy aniline (5.1 mmol) in 10 ml dry toluene in an inert atmosphere. The suspension was refluxed at 110° C. for 18 h. The reaction mixture was cooled to 28° C. and the solid was filtered, washed with dry toluene (4×10 ml) and subjected to the soxhlet extraction with toluene and iso-propanol (7:3, 50 ml) for 10 h. Finally the sample was dried under normal vacuum at 40° C. Yield; (2.0 g, loading of aminoalcohol on MCF was found to be 0.47 mmol/g).

Step 4

(S)-aminopropyl alcohol-copper-support-MCF (Catalyst 18)

(S)-aminopropyl alcohol-support-MCF (2.0 g) as obtained from the step 3 of this example and copper acetate monohydrate (2.0 mmol) were taken in absolute ethanol (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under vacuum at 110° C. for 24 h. The dried material was ground well and sieved using 400 mesh (0.037 mm) size test sieves. Yield: 2.1 g; Loading of copper complex of aminoalcohol on MCF as determined by TGA was found to be 0.31 mmol/g. FT-IR (characteristic peaks), 3460, 2957, 2932, 1641, 1446 cm$^{-1}$. BET surface area: 361 m$^2$/g; Pore volume: 0.874 cm$^3$/g; BJH pore diameter: 109.2 Å

Example 19

Step 1

(2'S)—N'-(2',3'-epoxypropyl)-3-(N-methylaminopropyl)-trimethoxysilane

This material was prepared by the method described in the step 1 of the example 5.

Step 2

(S)-aminopropyl epoxy-support-MCF

This material was prepared by following the procedure given in step 2 of the example 5.

Step 3

(S)-aminopropyl alcohol-support-MCF

The epoxy product from the step 2 (2.0 g) of this example was treated with 4-chloro aniline (5.1 mmol) in 10 ml dry toluene in an inert atmosphere. The suspension was refluxed at 110° C. for 18 h. The reaction mixture was cooled to 28° C. and the solid was filtered, washed with dry toluene (5×10 ml) and subjected to the soxhlet extraction with toluene and iso-propanol (7:3, 50 ml) for 10 h. Finally the sample was dried under vacuum at 40° C. Yield; (2 g, loading of aminoalcohol on MCF was found to be 0.51 mmol/g).

Step 4

(S)-aminopropyl alcohol-copper-support-MCF (Catalyst 19)

(S)-aminopropyl alcohol-support-MCF (2.0 g) as obtained from the step 3 of this example and copper acetate monohydrate (2.0 mmol) were taken in absolute ethanol (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on MCF as determined by TGA was found to be 0.34 mmol/g. FT-IR (characteristic peaks), 3468, 2959, 2938, 1636, 1447 cm$^{-1}$. BET surface area: 388 m$^2$/g; Pore volume: 0.897 cm$^3$/g; BJH pore diameter: 109.5 Å

Example 20

Step 1

(2'S)—N'-(2',3'-epoxypropyl)-3-(N-methylaminopropyl)-trimethoxysilane

This material was prepared by the method described in the step 1 of the example 5.

Step 2

(S)-aminopropyl epoxy-support-MCF

This material was prepared by following the procedure given in step 2 of the example 5.

Step 3

(S)-aminopropyl alcohol-support-MCF

The epoxy product from the step 2 (2.0 g) of this example was treated with 4-methyl aniline (5.1 mmol) in 10 ml dry toluene in an inert atmosphere. The suspension was refluxed at 110° C. for 18 h. The reaction mixture was cooled to 28° C. and the solid was filtered, washed with dry toluene (4×10 ml) and subjected to the soxhlet extraction with toluene and iso-propanol (7:3, 50 ml) for 10 h. Finally the sample was dried under normal vacuum at 40° C. Yield; (2.0 g, loading of aminoalcohol on MCF was found to be 0.47 mmol/g).

Step 4

(S)-aminopropyl alcohol-copper-support-MCF (Catalyst 20)

(S)-aminopropyl alcohol-support-MCF (2.0 g) as obtained from the step 3 of this example and copper acetate monohydrate (2.0 mmol) were taken in absolute ethanol (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on MCF as determined by TGA was found to be 0.33 mmol/g. FT-IR (characteristic peaks), 3460, 2950, 2939, 1641, 1448 cm$^{-1}$. BET surface area: 395 m$^2$/g; Pore volume: 0.807 cm$^3$/g; BJH pore diameter: 110.1 Å

Example 21

Step 1

(2'S)—N'-(2',3'-epoxypropyl)-3-(N-methylaminopropyl)-trimethoxysilane

This material was prepared by the method described in the step 1 of the example 9.

Step 2

(S)—N-methylaminopropyl epoxy-support-15

This material was prepared by following the procedure given in step 2 of the example 9.

Step 3

(S)—N-methyl aminopropyl alcohol-support-15

The epoxy product from the step 2 (2.0 g) of this example was treated with 4-methyl aniline (2.0 mmol) in 10 ml dry toluene in an inert atmosphere. The suspension was refluxed at 110° C. for 18 h. The reaction mixture was cooled to 28° C. and the solid was filtered, washed with dry toluene (5×10 ml) and subjected to the soxhlet extraction with toluene and iso-propanol (7:3, 50 ml) for 10 h. Finally the sample was dried under normal vacuum at 40° C. Yield; (2.0 g, loading of aminoalcohol on SBA-15 was found to be 0.47 mmol/g).

Step 4

(S)—N-methyl aminopropyl alcohol-copper-support-15 (Catalyst 21)

(S)—N,N'-dimethyl aminopropyl alcohol-support-15 (2.0 g) as obtained from step 3 of this example and copper acetate monohydrate (2.0 mmol) were taken in absolute ethanol (10 ml) and the resulting suspension was stirred at 28° C. for 12 h. Then the solvent was removed by filtration and the light greenish powder thus obtained was subjected to Soxhlet extraction with 2-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on SBA-15 as determined by TGA was found to be 0.32 mmol/g. FT-IR (characteristic peaks), 3466, 2950, 2934, 1636, 1448 cm$^{-1}$. BET surface area: 273 m$^2$/g; Pore volume: 0.500 cm$^3$/g; BJH pore diameter: 61.8 Å

Example 22

Step 1

(2'S)—N'-(2',3'-epoxypropyl)-3-(N-methylaminopropyl)-trimethoxysilane

This material was prepared by the method described in the step 1 of the example 9.

Step 2

(S)—N-methyl aminopropyl epoxy-support-15

This material was prepared by following the procedure given in step 2 of the example 9.

Step 3

(S)—N-methyl aminopropyl alcohol-support-15

The epoxy product from the step 2 (2.0 g) of this example was treated with 4-methoxy aniline (5.1 mmol) in 10 ml dry toluene in an inert atmosphere. The suspension was refluxed at 110° C. for 18 h. The reaction mixture was cooled to 28° C. and the solid was filtered, washed with dry toluene (4×10 ml) and subjected to the soxhlet extraction with toluene and iso-propanol (7:3, 50 ml) for 10 h. Finally the sample was dried under normal vacuum at 40° C. Yield; (2.0 g, loading of aminoalcohol on SBA-15 was found to be 0.47 mmol/g).

Step 4

(S)—N,-methyl aminopropyl alcohol-copper-support-15 (Catalyst 22)

(S)—N-methyl aminopropyl alcohol-support-15 (2.0 g) as obtained from the step 3 of this example and copper acetate monohydrate (2.0 mmol) were taken in absolute ethanol (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on SBA-15 as determined by TGA was found to be 0.32 mmol/g. FT-IR (characteristic peaks), 3460, 2950, 2938, 1642, 1449 cm$^{-1}$. BET surface area: 259 m$^2$/g; Pore volume: 0.513 cm$^3$/g; BJH pore diameter: 61.1 Å

Example 23

Step 1

(2'S)—N'-(2',3'-epoxypropyl)-3-(N-methylaminopropyl)-trimethoxysilane

This material was prepared by the method described in the step 1 of the example 9.

Step 2

(S)—N-methylaminopropyl epoxy-support-15

This material was prepared by following the procedure given in step 2 of the example 9.

Step 3

(S)—N-methyl aminopropyl alcohol-support-15

The epoxy product from the step 2 (2.0 g) of this example was treated with 4-chloro aniline (5.1 mmol) in 10 ml dry toluene in an inert atmosphere. The suspension was refluxed at 110° C. for 18 h. The reaction mixture was cooled to 28° C. and the solid was filtered, washed with dry toluene (5×10 ml) and subjected to the soxhlet extraction with toluene and iso-propanol (7:3, 50 ml) for 10 h. Finally the sample was dried under normal vacuum at 40° C. Yield; (2.0 g, loading of aminoalcohol on SBA-15 was found to be 0.47 mmol/g).

Step 4

(S)—N-methyl aminopropyl alcohol-copper-support-15 (Catalyst 23)

(S)—N-methyl aminopropyl alcohol-support-15 (2.0 g) as obtained from the step 3 of this example and copper acetate monohydrate (2.0 mmol) were taken in absolute ethanol (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on SBA-15 as determined by TGA was found to be 0.32 mmol/g. FT-IR (characteristic peaks), 3462, 2952, 2936, 1638, 1446 cm$^{-1}$. BET surface area: 266 m$^2$/g; Pore volume: 0.490 cm$^3$/g; BJH pore diameter: 61.5 Å

Example 24

Step 1

(2'S)—N-(2',3'-epoxypropyl)-3-(aminopropyl)-trimethoxysilane

Synthesized as per the method given in step 1 of the example 1.

Step 2

(S)-aminopropyl epoxy-support-silica gel

The product of step 1 (2.0 mmol) of this example was dissolved in dry toluene (15 ml) in 3-necked 50 ml round bottom flask in an inert atmosphere. Then this dissolved mass was treated with silica gel (2.0 g, BET surface area: 412 m$^2$/g; Pore volume: 0.651 cm$^3$/g; BJH pore diameter: 69.8 Å) for 48 h. at refluxing temperature. The reaction mass was filtered and washed with dry toluene (4×10 ml) and then dried under normal vacuum. The dried material was subjected to Soxhlet extraction with dry toluene for 10 h followed by drying the sample under vacuum. Yield; (2.0 g, loading of amino-epoxy compound on silica gel was found to be 0.54 mmol/g). FTIR (KBr): 463, 804, 1091, 1240, 1465, 1645, 2358, 2982, 3434 cm$^{-1}$, CHN analysis (Found) C, 4.82; H, 0.80; N, 0.45% (C/N=10.71, C/H=6.03).

Step 3

(S)-aminopropyl alcohol-support-silica gel

The epoxy product from the step 2 (2.0 g) of this example was treated with aniline (5.1 mmol) in 10 ml dry toluene in inert atmosphere. The suspension was refluxed at 110° C. for 12 h. The reaction mixture was cooled to 28° C. and the solid was filtered, washed with dry toluene (5×10 ml) and subjected to the soxhlet extraction with toluene and iso-propanol (7:3, 50 ml) for 10 h. Finally the sample was dried under normal vacuum at 40° C. Yield; (2.0 g, loading of aminoalcohol on silica gel was found to be 0.55 mmol/g). FTIR (KBr): 457, 805, 955, 1070, 1388, 1450, 1531, 1646, 2338, 2360, 2979, 3417 cm$^{-1}$. CHN analysis (Found) C, 6.12; H, 0.94; N, 0.52% (C/N=11.77, C/H=6.51).

Step 4

(S)-aminopropyl alcohol-copper-support-silica gel (Catalyst 24)

(S)-amino alcohol-support-silicagel (2.0 g) as obtained from step 3 of this example and copper acetate monohydrate (2.0 mmol) were taken in absolute ethanol (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves.

Yield: 2.1 g; Loading of copper complex of aminoalcohol on silica gel as determined by TGA was found to be 0.32 mmol/g. FT-IR (characteristic peaks) 464, 805, 957, 1102, 1251, 1380, 1450, 1535, 1645, 2356, 2981, 3441 cm$^{-1}$. BET surface area: 311 m2/g; Pore volume: 0.524 cm3/g; BJH pore diameter: 62.7 Å CHN analysis (Found) C, 6.42; H, 1.00; N, 0.38% (C/N=16.89, C/H=6.42).

Example 25

Step 1

(2'R)—N-(2',3'-epoxypropyl)-3-(aminopropyl)-trimethoxysilane

This material was synthesized as per the method described in step 1 of the example 2.

Step 2

(R)-aminopropyl epoxy-support-silica gel

The product of step 1 (2.0 mmol) of this example was dissolved in dry toluene (15 ml) in 3-necked 50 ml round bottom flask in inert atmosphere. Then this dissolved mass was treated with silicagel (2.0 g, BET surface area: 412 m$^2$/g; Pore volume: 0.651 cm$^3$/g; BJH pore diameter: 69.8 Å) and processed as per the method of step 2 of example 5, Yield; (2.0 g, loading of amino-epoxy compound on silica gel was found to be 0.53 mmol/g).

Step 3

(R)-aminopropyl alcohol-support-silica gel

The epoxy product from the step 2 (2.0 mmol) of this example was treated with aniline (5.1 mmol) in 10 ml dry toluene in an inert atmosphere and the reaction was processed as per the step 3 of the example 5, Yield; (2 g, loading of aminoalcohol on silica gel was found to be 0.54 mmol/g).

Step-4

(R)-aminopropyl alcohol-copper-support-silica gel (Catalyst 25)

(S)-amino alcohol-support-silica gel (2.0 g) as obtained from step 3 of this example and copper acetate monohydrate (2.0 mmol) were taken in absolute ethanol (10 ml) and the resulting suspension was stirred at 28° C. for 12 h. Then the solvent was removed by filtration and the light greenish powder thus obtained was subjected to Soxhlet extraction with iso-propanol (50 ml) for 10 h, filtered and dried under normal vacuum at 110° C. for 24 h. The dried material was ground well and sieved using 400 mesh (0.037 mm) size test sieves. Yield: 2.1 g; Loading of copper complex of aminoalcohol on silica gel as determined by TGA was found to be 0.31 mmol/g. FT-IR (characteristic peaks), 3462, 3446, 2952, 2936, 1638, 1446 cm$^{-1}$. BET surface area: 299 m2/g; Pore volume: 0.507 cm3/g; BJH pore diameter: 63.0 Å.

Example 26

Asymmetric nitroaldol reactions were carried out in a screw cap vials with magnetic stirring with highly dry and inert condition. Silica supported chiral copper (II) complex (Catalyst 3) (0.108 g, 0.04 mmol) was added to absolute ethanol (1 ml) at 28° C. Reaction mass was stirred after addition of base 7c ($R_{22}$=OCH$_3$, $R_{23-26}$=H, $R_{27-31}$=H, $R_3$=CH$_3$, *=S) as additive (0.1 mmol) and then benzaldehyde (0.4 mmol) and nitromethane (5.5 mmol) were added to the resulting light green solution and stirring continued for 40 h at room temperature at 27° C. The completion of the reaction was monitored by thin layer chromatography (TLC). The mixture was filtered and washed with dry ethanol and dried over MgSO$_4$ then evaporated in vacuum to obtain nitroalcohols as product. The residue was purified by column chromatography by using n-hexane/EtOAc (90:10) to get pure nitroalcohols as product. Enantiomeric excess was determined by HPLC analysis using chiral column OD, OD-H and AD. Yield; (97%), ee; (97%).

Example 27-45

Asymmetric nitroaldol reactions of various aldehydes with nitromethane using various supported catalyst 1-24 in the absence of a base (Table 2, examples 27-35) and in the presence of a base 7c ($R_{22}$=OCH$_{33}$, $R_{23-26}$=H, $R_{27-31}$=H, $R_3$=CH$_3$, *=S) (Table 2, examples 36-53) were carried out in a similar manner as given in example 26. The data are summarized in Table 2: Here we have used different catalysts and different aldehydes like aromatic, aliphatic, alicyclic and unsaturated α,β unsaturated aldehyde and found almost moderate to excellent conversion and selectivity.

TABLE 2

Asymmetric nitroaldol reactions of various aldehydes using different Catalysts:

| Examples | Aldehyde | Catalyst | Base | Yield (%) | ee (%) |
|---|---|---|---|---|---|
| 27 | benzaldehyde | Catalyst 1 | — | 86 | 70 |
| 28 | benzaldehyde | Catalyst 2 | — | 88 | 72 |
| 29 | benzaldehyde | Catalyst 3 | — | 90 | 75 |
| 30 | benzaldehyde | Catalyst 4 | — | 89 | 76 |
| 31 | benzaldehyde | Catalyst 5 | — | 91 | 80 |
| 32 | benzaldehyde | Catalyst 10 | — | 85 | 66 |
| 33 | benzaldehyde | Catalyst 14 | — | 80 | 60 |
| 34 | benzaldehyde | Catalyst 21 | — | 88 | 74 |
| 35 | benzaldehyde | Catalyst 24 | — | 82 | 65 |
| 36 | 2-mehoxy benzaldehyde | Catalyst 3 | 7c | 70 | 69 |
| 37 | 3-methoxy benzaldehyde | Catalyst 3 | 7c | 92 | 94 |
| 38 | 4-methoxy benzaldehyde | Catalyst 3 | 7c | 85 | 95 |
| 39 | 4-chloro benzaldehyde | Catalyst 3 | 7c | 72 | 86 |
| 40 | 4-bromo benzaldehyde | Catalyst 3 | 7c | 73 | 99 |
| 41 | 4-fluoro benzaldehyde | Catalyst 3 | 7c | 68 | 30 |
| 42 | 4-trifluoro benzaldehyde | Catalyst 3 | 7c | 72 | 98 |
| 43 | 4-methyl benzaldehyde | Catalyst 3 | 7c | 85 | 5 |
| 44 | 4-nitro benzaldehyde | Catalyst 3 | 7c | 62 | 64 |
| 45 | cyclohexanal | Catalyst 3 | 7c | 93 | 89 |
| 46 | α-methyl cinnamaldehyde | Catalyst 3 | 7c | 76 | 98 |
| 47 | Hexanal | Catalyst 3 | 7c | 61 | 92 |
| 48 | benzaldehyde | Catalyst 1 | 7c | 92 | 93 |
| 49 | benzaldehyde | Catalyst 2 | 7c | 90 | 86 |
| 50 | benzaldehyde | Catalyst 3 | 7c | 97 | 97 |
| 51 | benzaldehyde | Catalyst 4 | 7c | 96 | 94 |
| 52 | benzaldehyde | Catalyst 5 | 7c | 98 | 95 |
| 53 | benzaldehyde | Catalyst 24 | 7c | 90 | 97 |

Example 54

Catalyst 3 recovered from the example 26 was washed with toluene and iso-propanol and reused in asymmetric nitroaldol reaction of benzaldehyde in exactly the same manner as described in example 22 to get nitroalcohol in 97% yield and 97% ee.

Example 55

Catalyst 3 recovered from the example 54 was washed with toluene and iso-propanol and reused in asymmetric nitroaldol reaction of benzaldehyde in exactly the same manner as described in example 26 to get nitroalcohol in 96% yield and 97% ee.

Example 56

Catalyst 3 recovered from the example 55 was washed with toluene and iso-propanol and reused in asymmetric nitroaldol reaction of benzaldehyde in exactly the same manner as described in example 26 to get nitroalcohol in 95% yield and 96% ee.

Example 57

This example constitutes results of 20 different catalytic experiments as tabulated in Table 3 for the asymmetric nitroaldol reaction of nitromethan (5.5 mmol) with benzaldehyde (0.4 mmol) in the presence of silica material (0.108 g) in the presence or absence of a base using absolute ethanol (1 ml) as solvent at 28° C. under stirring for 40 h. These experiments were done in order to demonstrate that unmodified silica support, modified silica support and various bases as additives independently do not give desired activity and enantioselectivity in nitroaldol reaction. The best results were obtained in the case of nitroaldol of benzaldehyde with nitromethane under the above reaction condition having materials as per entry 16 of this example.

TABLE 3

Catalytic Study of Mixture of Different Materials on Asymmetric Nitroaldol Reaction

| Entry | Materials | Yield (%) | ee (%) |
|---|---|---|---|
| 1 | Catalyst 1 | 86 | 70 |
| 2 | Catalyst 2 | 88 | 72 |
| 3 | Catalyst 3 | 90 | 75 |
| 4 | Catalyst 4 | 89 | 76 |
| 5 | Catalyst 5 | 91 | 80 |
| 6 | Catalyst 10 | 85 | 66 |
| 7 | Catalyst 14 | 80 | 60 |
| 8 | Catalyst 21 | 88 | 74 |
| 9 | Catalyst 24 | 82 | 65 |
| 10 | Catalyst 3 + 2,6-lutidine | 30 | — |
| 11 | Catalyst 3 + Triethyl amine | 90 | 19 (S) |
| 12 | Catalyst 3 + 6c ($R_{22-26}$ and $R_{27-31}$=H, $R_{32}$=CH$_3$) | 85 | 72 (S) |
| 13 | Catalyst 3 + 6c ($R_{22, 23, 25, 26}$ and $R_{27-31}$=H, $R_{24\ and\ 32}$=CH$_3$) | 96 | 75 (S) |
| 14 | Catalyst 3 + 6c ($R_{22, 23, 25, 26}$ and $R_{27-31}$=H, $R_{24}$=Cl, $R_{32}$=CH$_3$) | 95 | 77 (S) |
| 15 | Catalyst 3 + 6c ($R_{22, 23, 25, 26}$ and $R_{27-31}$=H, $R_{24}$=NO$_2$, $R_{32}$=CH$_3$) | 92 | 74 (S) |
| 16 | Catalyst 3 + 6c ($R_{22}$=OCH$_3$ $R_{23-26}$ and $R_{27-31}$=H, $R_{32}$=CH$_3$) | 97 | 97 (S) |
| 17 | SBA-15 | — | — |
| 18 | MCF | — | — |
| 19 | Silica gel | — | — |
| 20 | SBA-15 + 6c ($R_{22}$=OCH$_3$ $R_{23-26}$ and $R_{27-31}$=H, $R_{32}$=CH$_3$) | — | — |

Example 58

This example was conducted in the same manner as given in example 26 except that the solvent used was as per the entry 1-6 given in Table 4. The respective results are given against each entry.

TABLE 4

Effect of Solvent on Asymmetric Nitroaldol Reaction of Benzaldehyde

| Entry | Solvent | Yield (%) | ee (%) |
|---|---|---|---|
| 1 | Toluene | 98 | 19 |
| 2 | Tetrahydrofuran (THF) | 92 | 28 |
| 3 | Diethylether (DEE) | 95 | 10 |
| 4 | Dichloromethane (DCM) | 93 | 22 |
| 5 | Ethanol | 97 | 97 |
| 6 | Methanol | 92 | 67 |

Example 59

This example was conducted in the same manner as given in example 26 except that the temperature used was as per the entries 1-4 given in Table 5. The respective results are given against each entry.

TABLE 5

Temperature Effect of Asymmetric Nitroaldol Reaction of 4-nitrobenzaldehyde

| Entry | Temperature | Yield (%) | ee (%) |
|---|---|---|---|
| 1 | −10° C. | 26 | 38 |
| 2 | 0° C. | 40 | 18 |
| 3 | 0° C. addition then room temperature | 60 | 20 |
| 4 | 28° C. | 62 | 64 |

ADVANTAGES

The main advantages of the present invention are:

1. Chiral heterogeneous catalysts prepared in the present invention are highly active and enantioselective for the nitroaldol reaction of different types of aldehydes.
2. The nitroaldol reaction condition with the use of chiral heterogeneous catalyst prepared in the present invention requires no external heating or cooling to show high activity and enantioselectivity.
3. Only a moderate catalyst loading is required to carry out nitroaldol reaction.
4. The chiral heterogeneous catalysts prepared in the present invention are recoverable and can be recycled for several catalytic runs with no apparent loss in activity and enantioselectivity.
5. Due to the easy separation of the catalyst from the catalytic reaction mixture and ability to recycle the catalyst, the enantioselective nitroaldol reaction protocol disclosed in the present invention can be potentially used economically for industrial application.

We claim:

1. A chiral heterogeneous catalyst of general formula 1,

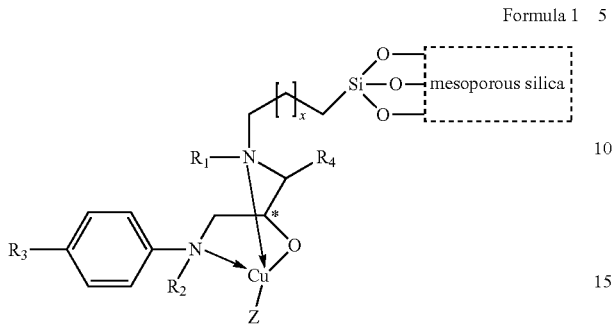

Formula 1

Wherein,
$R_1=R_2=$H or $CH_3$
$R_3=$Cl, I, F, Br, $OCH_3$, $CH_3$, $OC_2H_5$, $NO_2$
$R_4=$H, $CH_3$, $C_2H_5$
x=1, 2
$Z=CH_3CO_2^-$, $Cl^-$, $OH^-$, $NO_3^-$.

2. A chiral heterogeneous catalyst of formula 1 as claimed in claim 1, wherein mesoporous silica used is selected from the group consisting of silica gel, Mobile Crystalline Materials (MCM-41), Santa Barbara Amorphous (SBA-15) and Meso Cellular Foams (MCF) having porosity in the range of 30 to 120 Å.

3. A chiral heterogeneous catalyst of formula 1 as claimed in claim 1, wherein catalysts of formula 1 are represented as (S)-aminopropyl alcohol-copper-support-41, (R)-aminopropyl alcohol-copper-support-41, (S)-aminopropyl alcohol-copper-support-15, (R)-aminopropyl alcohol-copper-support-15, (S)-aminopropyl alcohol-copper-support-MCF, (R)-aminopropyl alcohol-copper-support-Mesocellular Foams (MCF), (S)-aminopropyl alcohol-copper-support-Mesocellular Foams (MCF), (R)-aminopropyl alcohol-copper-support-Mesocellular Foams (MCF), (S)—N-methyl aminopropyl alcohol-copper-support-41, (R)—N-methyl aminopropyl alcohol-copper-support-41, (S)—N,N'-dimethyl aminopropyl alcohol-copper-support-41, (S)—N,N'-dimethyl aminopropyl alcohol-copper-support-15, (S)—N-methyl aminopropyl alcohol-copper-support-15, (S)-aminopropyl alcohol-copper-support-silicagel and (R)-aminopropyl alcohol-copper-support-silicagel.

4. A process for the preparation of chiral heterogeneous catalyst of formula 1 as claimed in claim 1, wherein the said process comprises of steps:
i. silylating a chiral [(S)/(R)-(+)/(−)-] epoxide ranging between 1.0-15 mmol/g of mesoporous silica with substituted aminopropyl trialkoxysilane ranging between 1.0-15 mmol/g of mesoporous silica in an equimolar ratio in the presence of alkali carbonate in a molar ratio ranging between 1.0 to 5 based on chiral epoxide in dry tetrahydrofuran (THF);
ii. refluxing the reaction mixture as obtained in step (i) under inert atmosphere for a period in the range of 8 to 16 h at temperature ranging between 65 to 66° C.;
iii. filtering the reaction mixture as obtained in step (ii) to obtain clear solution;
iv. refluxing the clear solution as obtained in step (iii) with mesoporous silica in the range (3.5:10) in dry toluene under inert atmosphere for a period in the range of 35 to 55 h at temperature ranging between 110 to 115° C.;
v. filtering the reaction mixture as obtained in step (iv) to obtain solid material, followed by washing with toluene and Soxhlet extraction in toluene;
vi. reacting the washed solid material as obtained in step (v) with substituted anilines in the concentration ranging between 2 to 30 mmol/g of the solid material under reflux condition in inert atmosphere for a period ranging between 8-16 h in toluene at temperature ranging between 110 to 115° C.;
vii. reacting the washed solid material as obtained in step (vi) with copper salt in ethanol in the concentration range of 1.0 to 20.0 mmol/g of material obtained in step (vi) in inert atmosphere for a period in the range of 8-16 h at room temperature in the range of 25 to 35° C.;
viii. filtering the reaction mixture of step (vii) to obtain solid material, followed by washing with toluene and again Soxhlet extraction in toluene to obtain chiral heterogeneous catalyst.

5. A process as claimed in claim 4, wherein chiral epoxide used in step (i) is selected from the group consisting of 1-chloro-2,3-epoxypropane, 1-fluoro-2,3-epoxypropane, 1-bromo-2,3-epoxypropane, 1-chloro-2,3-epoxy butane and 1-chloro-2,3-epoxy pentane.

6. A process as claimed in claim 4, wherein substituted aminopropyl trialkoxysilane used in step (i) is selected from the group consisting of aminopropyl triethoxysilane, aminopropyl trimethoxysilane, aminopropyl tributoxysilane, N-methyl aminopropyl trimethoxysilane, N-methyl aminopropyl triethoxysilane, N-methyl aminopropyl tributoxysilane, aminobutyl trimethoxysilane and aminopentyl triethoxysilane.

7. A process as claimed in claim 4, wherein alkali carbonate used in step (i) is selected from the group consisting of sodium carbonate, potassium carbonate, rubidium carbonate and cesium carbonate.

8. A process as claimed in claim 4, wherein the molar ratio of substituted aniline and chiral epoxide is in the range of 1:1 to 1:2.

9. A process as claimed in claim 4, wherein substituted aniline used in step (vi) are selected from the group consisting of aniline, nitroaniline, fluoroaniline, chloroaniline, bromoaniline, iodoaniline, methoxyaniline, ethoxyaniline and methylaniline.

10. A process as claimed in claim 4, wherein copper salt used in step (vii) is selected from the group consisting of copper chloride, copper acetate, copper sulphate and copper triflate.

11. A process as claimed in claim 4, wherein copper loading on chiral heterogeneous catalyst is in the range of 10 to 25 mol %.

12. A process for preparation of nitroalcohol by asymmetric nitroaldol reactions using chiral heterogeneous catalyst of general formula 1 as claimed in claim 1, wherein said process comprising the steps of;
a) stirring chiral heterogeneous catalyst in a solvent and a base as an additive in a screw cap vials under inert and dry condition for a period ranging between 1 to 5 min at a temperature ranging between 25 to 28° C.;
b) adding nitromethane and an aldehyde into the solution as obtained in step (a) followed by continuous stirring for a period ranging between 36 to 48 hrs at temperature ranging between −20 to 110° C., preferably in the range of 10-60° C.;
c) filtering the reaction mixture as obtained in step (b) followed by washing with dry ethanol and drying over magnesium sulphate;

d) evaporating the solvent from the solution as obtained in step ⓒ under vacuum to obtain nitroalcohol;

e) purifying the residue as obtained in step (d) by column chromatography using mixture of n-hexane and ethyl acetate (90:10) to obtain pure nitroalcohol.

13. A process as claimed in claim 12, wherein heterogeneous asymmetric catalyst used in step (a) ranges between 1 to 50 mol %, preferably in the range of 5 to 35 mol % based on aldehyde.

14. A process as claimed in claim 12, wherein base used in step (a) ranges between 1.0 to 100 mol %, preferably in the range of 10 to 40 mol % based on aldehyde.

15. A process as claimed in claim 12, wherein nitromethane used in step (b) ranges between 0.4 to 5.5 m·mol.

16. A process as claimed in claim 12, wherein base used in step (a) is selected from the group consisting of primary amine, secondary amine, tertiary amine, pyridine, 2-methyl pyridine, 2,6-lutidine, trimethylamine, triethylamine, (S)—N-benzylidene-1-phenylethanamine, (S)—N-(4-methylbenzylidene)-1-phenylethanamine, (S)—N-(4-chlorobenzylidene)-1-phenylethanamine, (S)—N-(4-nitrobenzylidene)-1-phenylethanamine, (S)—N-(2-methoxybenzylidene)-1-phenylethanamine, (R)—N-benzylidene-1 phenylethanamine, (R)—N-(4-methylbenzylidene)-1-phenylethanamine, (R)—N-(4-chlorobenzylidene)-1-phenylethanamine, (R)—N-(4-nitrobenzylidene)-1-phenylethanamine and (R)—N-(2-methoxybenzylidene)-1-phenylethanamine.

17. A process as claimed in claim 12, wherein aldehyde used in step (b) is selected from the group consisting of aromatic aldehyde, aliphatic aldehyde, α,β-unsaturated aldehydes and alicyclic aldehydes.

18. A process as claimed in claim 12, wherein solvent used in step (a) is selected from the group consisting of toluene, tetrahydrofuran, diethyl ether and ethanol.

19. A process as claimed in claim 12, wherein enantiomeric excess of nitro alcohols obtained is in the range of 5 to 99%.

20. A process as claimed in claim 12, wherein yield of nitro alcohols obtained is in the range of 61-98%.

21. A process as claimed in claim 12, wherein catalyst used in step (a) is recyclable.

* * * * *